(12) United States Patent
Nakatsugawa et al.

(10) Patent No.: US 8,754,375 B2
(45) Date of Patent: Jun. 17, 2014

(54) RADIOLOGICAL IMAGE DETECTION APPARATUS AND METHOD OF MANUFACTURING THE SAME

(71) Applicant: FUJIFILM Corporation, Tokyo (JP)

(72) Inventors: Haruyasu Nakatsugawa, Kanagawa (JP); Yasuhisa Kaneko, Kanagawa (JP); Keiichirou Sato, Kanagawa (JP); Makoto Kitada, Kanagawa (JP); Kei Miura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/926,170

(22) Filed: Jun. 25, 2013

(65) Prior Publication Data

US 2013/0284933 A1  Oct. 31, 2013

Related U.S. Application Data

(63) Continuation of application No. PCT/JP2011/062400, filed on May 30, 2011.

(30) Foreign Application Priority Data

Dec. 27, 2010  (JP) ................................. 2010-291387

(51) Int. Cl.
*G01T 1/20* (2006.01)
(52) U.S. Cl.
USPC ...................................... 250/361 R
(58) Field of Classification Search
USPC ...................................... 250/361 R
See application file for complete search history.

(56) References Cited

U.S. PATENT DOCUMENTS

| | | |
|---|---|---|
| 5,338,926 A | 8/1994 | Yoshida |
| 2004/0195514 A1 | 10/2004 | Nagano |
| 2005/0051736 A1 | 3/2005 | Isoda et al. |
| 2005/0077479 A1 | 4/2005 | Isoda et al. |
| 2009/0084961 A1 | 4/2009 | Tonotani et al. |

FOREIGN PATENT DOCUMENTS

| | | |
|---|---|---|
| JP | 59122988 A | 7/1984 |
| JP | 5174747 A | 7/1993 |
| JP | 727864 A | 1/1995 |
| JP | 2001330677 A | 11/2001 |
| JP | 3333278 B | 10/2002 |
| JP | 200360181 A | 2/2003 |
| JP | 200375593 A | 3/2003 |
| JP | 2004325442 A | 11/2004 |

(Continued)

OTHER PUBLICATIONS

Communication issued Jun. 4, 2013; Japanese Office Action, in corresponding Japanese Patent Application No. 2010-291387.

(Continued)

*Primary Examiner* — David Porta
*Assistant Examiner* — Kenneth J Malkowski
(74) *Attorney, Agent, or Firm* — Sughrue Mion, PLLC

(57) ABSTRACT

The device includes: a scintillator 200 configured to emit fluorescence by irradiation of radiation, and a photodetector 40 configured to detect the fluorescence emitted from the scintillator 200 as an electrical signal, wherein the scintillator 200 includes a columnar section 20 which is disposed at a rear side of the photodetector 40 in a travel direction of the radiation and at the same time is formed by a group of columnar crystals 20A obtained through columnar growth of crystals of a fluorescent material, and a first non-columnar section 23 which is provided at the photodetector 40 side of the columnar section 20.

14 Claims, 9 Drawing Sheets

(56) References Cited

FOREIGN PATENT DOCUMENTS

| JP | 200569991 A | 3/2005 |
| JP | 200591222 A | 4/2005 |
| JP | 2007170908 A | 7/2007 |
| JP | 2007240306 A | 9/2007 |
| JP | 2007315866 A | 12/2007 |
| JP | 2008111789 A | 5/2008 |
| JP | 200998130 A | 5/2009 |
| JP | 2010112733 A | 5/2010 |

OTHER PUBLICATIONS

Written Opinion [PCT/ISA/237] mailed Jul. 5, 2011 in corresponding International Application No. PCT/JP2011/062400.

International Search Report [PCT/ISA/210] mailed Jul. 5, 2011 in corresponding International Application No. PCT/JP2011/062400.

Office Action dated Nov. 19, 2013 issued by the Japanese Patent Office in counterpart Japanese Patent Application No. 2010-291387.

Office Action dated Sep. 3, 2013 in Japanese Application No. 2010-291387.

RADIOLOGICAL IMAGE DETECTION APPARATUS AND METHOD OF MANUFACTURING THE SAME

CROSS REFERENCE TO RELATED APPLICATION

This is a continuation of International Application No. PCT/JP2011/062400 filed on May 30, 2011, and claims priority from Japanese Patent Application No. 2010-291387, filed on Dec. 27, 2010, the entire disclosures of which are incorporated herein by reference.

TECHNICAL FIELD

The present invention relates to a radiological image detection apparatus used for, for example, an X-ray imaging device for medical use, and a method of manufacturing the same.

BACKGROUND ART

Recently, a digital radiography (DR) that uses an X-ray image detection apparatus such as a flat panel detector (FPD) for converting X-rays into digital data has been practically used. The X-ray image detection apparatus has been rapidly distributed since it has a merit in that an image may be immediately confirmed, as compared to a conventional computed radiography (CR) method that uses an imaging plate.

As the X-ray image detection apparatus, various types have been proposed. For example, there is an indirect conversion type which converts X-rays into visible light using a scintillator such as CsI:Tl, GOS($Gd_2O_2S$:Tb) first, and converts the converted light into electric charges which are accumulated in a semiconductor layer. The indirect inversion type X-ray image detection apparatus includes a scintillator and a photodetector having a semiconductor layer.

In such an X-ray image detection apparatus, for example, in a case of being used in a living body, it is preferable to lower the X-ray irradiation dose, and a scintillator with a high luminescence amount and an excellent sensitivity is required. Thus, in order to increase the luminescence amount in the vicinity of the photodetector, there is proposed an X-ray image detection apparatus configured such that a scintillator such as CsI is deposited on a glass substrate of the photodetector and X-rays are irradiated toward scintillator from the photodetector side (see, e.g., Patent Literature 1 and Patent Literature 2).

Here, in theory, as the thickness of the crystal phase of the scintillator is increased, the sensitivity is improved. However, in practice, when the thickness of the crystal phase is increased beyond a limit, there is a problem in that light may be attenuated or disused when passing the scintillator and thus, sufficient sensitivity may not be obtained or blurring of an image may occur. For this reason, an aggregate of columnar crystals that guide emitted light is used (see, e.g., Patent Literature 3). Since the light is guided in the thickness direction of the panel of the scintillator by such columnar crystals and incident on the light director, the sharpness of a detection image is improved.

Here, an X-ray image detection apparatus of Patent Literature 3 is provided with a sensor board including a photoelectric conversion element, a phosphor underlayer having a surface disposed on the sensor board and subjected to an atmospheric pressure plasma processing, and a phosphor layer (scintillator) including columnar crystals formed on the phosphor underlayer in contact with the phosphor underlayer. Through the atmospheric pressure plasma processing to the underlayer, the adhesion between the underlayer and the phosphor layer is improved.

CITATION LIST

Patent Literature

Patent Literature 1: JP-B-3333278
Patent Literature 2: JP-A-2001-330677
Patent Literature 3: JP-A-2004-325442

SUMMARY OF INVENTION

Technical Problem

In an X-ray image detection apparatus, the adhesion between a scintillator and a sensor board of a photodetector is very important. In Patent Literature 3, although the adhesion between the underlayer and the phosphor layer is improved, it is impossible to secure the adhesion between the sensor board and the scintillator in this configuration.

If the adhesion with the sensor board is poor, there is possibility that the scintillator may be separated from the sensor board at the time of shock of falling-down or the like and when shock is directly applied to the separated portion, the scintillator may be damaged. Also, if the adhesion is poor, the scintillator may be easily peeled off from the sensor board due to, for example, a difference in the amount of thermal expansion between the scintillator and the sensor board. Moreover, if unevenness occurs in the adhesion between the sensor board and the scintillator, the quality of a detected image may be affected.

From the foregoing, an object of the present invention is to secure the adhesion of the photodetector with the scintillator.

Solution to Problem

A radiological image detection apparatus of the present invention comprises: a scintillator configured to emit fluorescence by irradiation of radiation, and a photodetector configured to detect the fluorescence emitted from the scintillator as an electrical signal, in which the scintillator comprises a columnar section which is disposed at a rear side of the photodetector in a travel direction of the radiation and is formed by a group of columnar crystals obtained through columnar growth of crystals of a fluorescent material, and a first non-columnar section which is provided at the photodetector side of the columnar section.

Also, a method of manufacturing the radiological image detection apparatus of the present invention is a method of manufacturing the above described scintillator, in which the columnar section and the first non-columnar section of the scintillator are formed on the support by depositing crystals of a fluorescent material on the support by a vapor deposition method, and the first non-columnar section is formed by varying at least one condition among a degree of vacuum, a support temperature, and an evaporation rate at the time of formation of the columnar section.

DESCRIPTION OF EMBODIMENTS

An example of an X-ray image detection apparatus (radiological image detection apparatus) for explaining an embodiment of the invention will be described below with reference to FIGS. 1 to 6.

Constituents similar to those in the aforementioned configuration are referred to by the same numerals correspondingly, and description thereof will be omitted or simplified.

1. OVERALL CONFIGURATION

Figure 1:
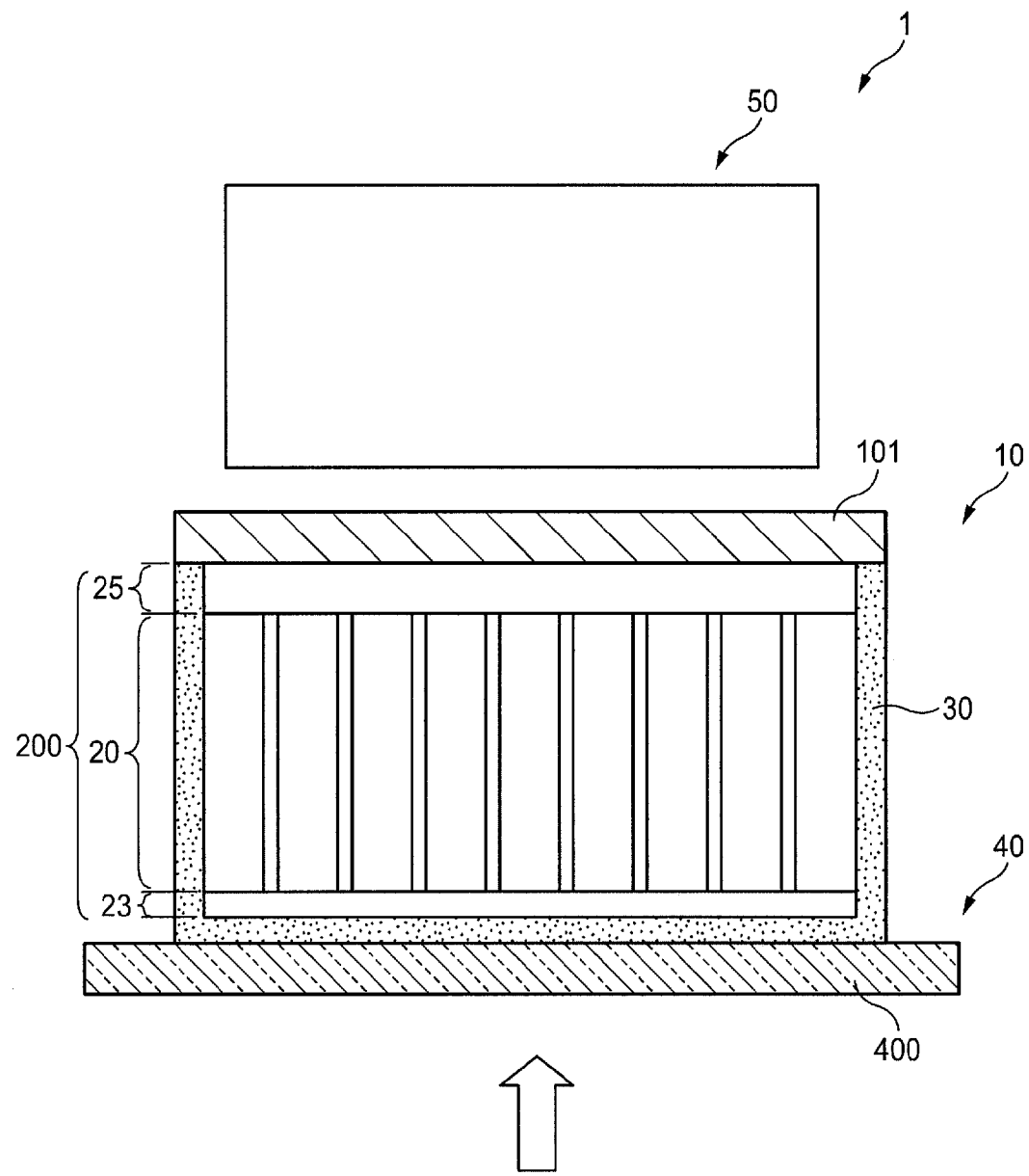
FIG. 1 is a side sectional view schematically illustrating a schematic configuration of an X-ray image detection apparatus.

FIG. 1 is a side cross-sectional view schematically illustrating an outline configuration of an indirect conversion type X-ray image detection apparatus 1. The X-ray image detection apparatus 1 is provided with a scintillator panel 10 including a scintillator 200 that emits light by the irradiation of X-rays, and a photodetector 40 that detects the light emitted from the scintillator 200 as an electrical signal.

As indicated by outline arrow of FIG. 1, in the X-ray image detection apparatus 1, X-rays that have passed a subject is irradiated from the photodetector side 40 toward the scintillator 200. The scintillator panel 10 is disposed at the rear side as compared to the photodetector 40 in the X-ray travelling direction. When X-rays are incident on the scintillator 200 through a sensor board 400 of the photodetector 40, the phosphor 200 absorbs the X-rays and emits light, and the light is incident on a photoelectric conversion element 41 formed on the sensor board 400. The electric charges accumulated in the photoelectric conversion element 41 of the sensor board 400 are output as an electric signal.

A control module 50 that drives and controls the photodetector 40 is provided at the opposite side to the X-ray entrance direction side to the scintillator panel 10. The control module 50 includes, for example, a circuit board on which an IC as a control unit that drives and controls the sensor board 400, an IC that processes an image signal or the like is mounted, and a power supply circuit. The control module 50 is integrally assembled to the scintillator panel 10 and the photodetector 40.

2. CONFIGURATION OF PHOTODETECTOR

Figure 2:
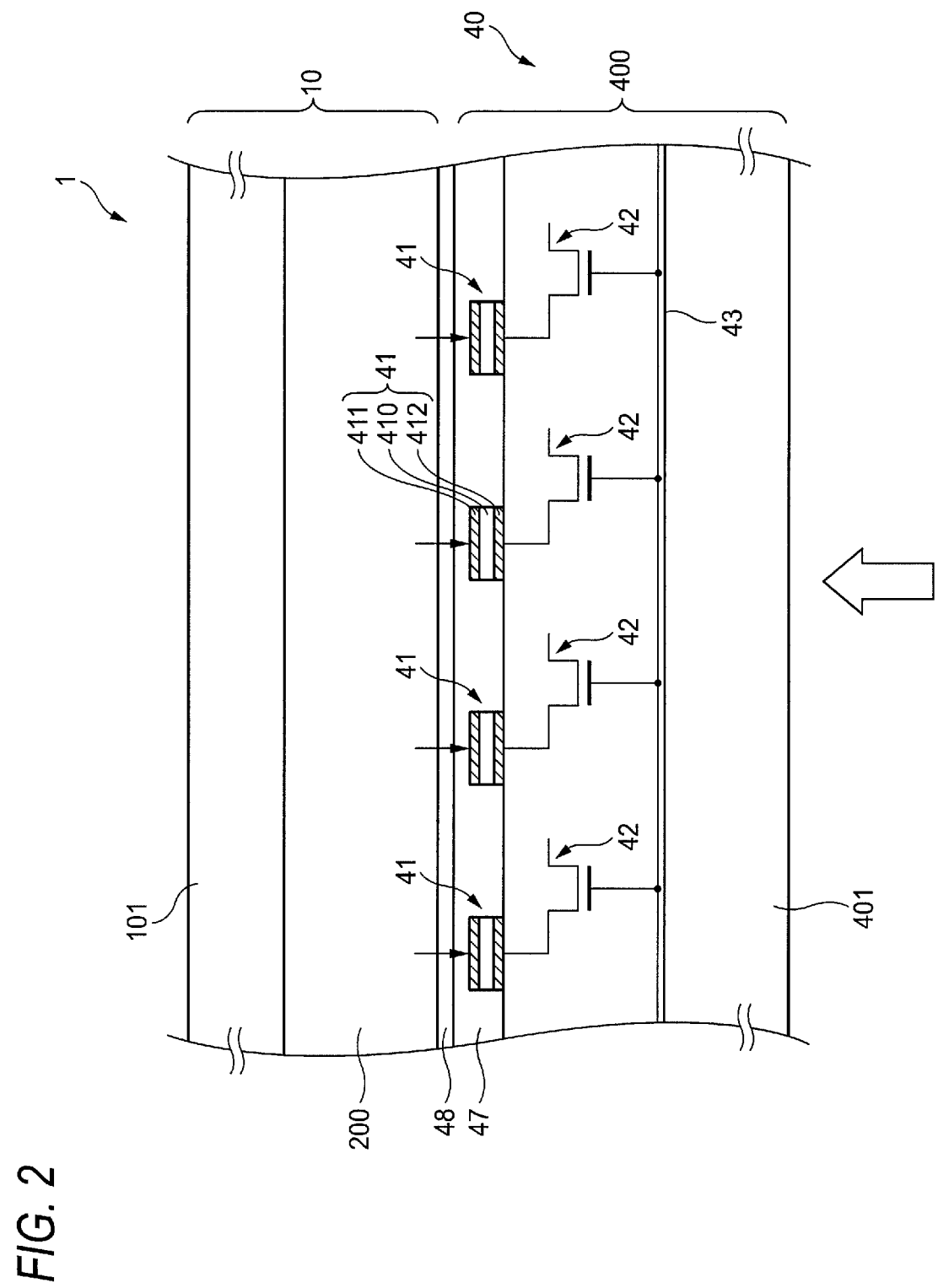
FIG. 2 is a side sectional view schematically illustrating a schematic configuration of a detector.
Figure 3:
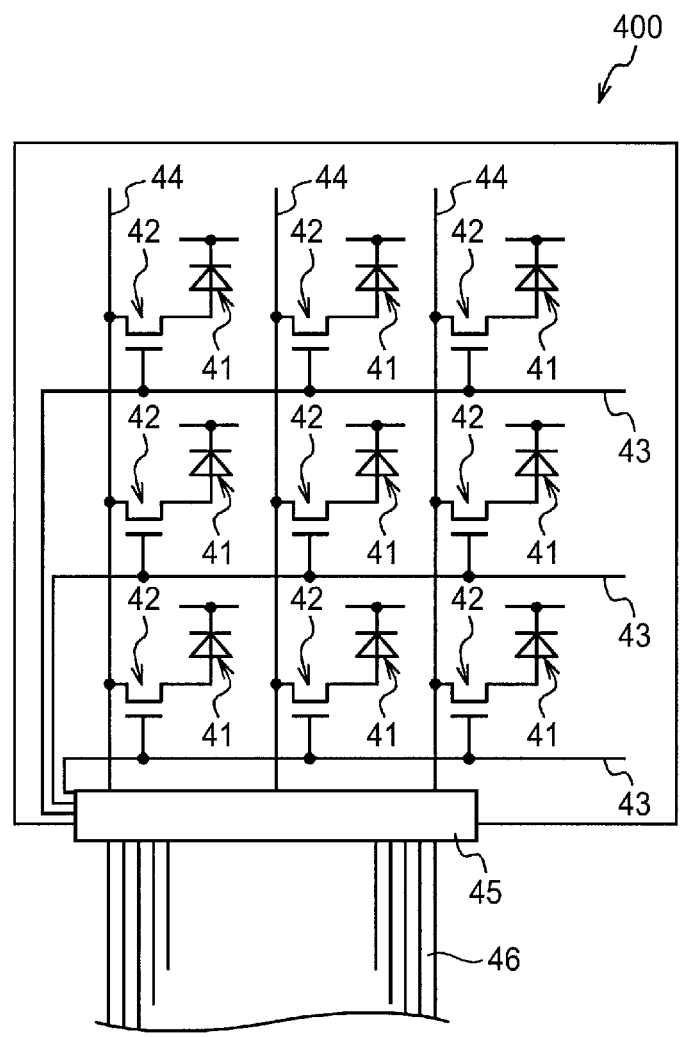
FIG. 3 is a plan view schematically illustrating a sensor board.

FIG. 2 is a side cross-sectional view schematically illustrating the configuration of the photodetector 40. FIG. 3 is a plan view schematically illustrating the sensor board 40. The photodetector 40 includes the sensor board 400 that is rectangular in plan view and is formed with a semiconductor layer. The sensor board 400 is configured to include an insulating substrate 401 such as glass, photoelectric conversion elements 41 such as a-Si photodiodes, and switching elements 42 such as thin film transistors (TFT).

As for the insulating substrate 401, for example, a glass substrate, various ceramic substrates, or a resin substrate may be used. Also, the material of the insulating substrate 401 is not limited to these materials.

Each of the photoelectric conversion elements 41 is configured by laminating a photoconductive layer 410 that converts the light (the solid line arrow in FIG. 2) incident from the scintillator 200 into electric charges, a bias electrode 411 that applies a bias voltage to the photoconductive layer 410, and a charge collecting electrode 412 that collects the electric charges accumulated in the photoconductive layer 410. As illustrated in FIG. 3, the photoelectric conversion elements 41 are two-dimensionally arranged, and each of the photoelectric conversion elements 41 forms a pixel of an image detected by the photodetector 40.

As illustrated in FIG. 3, the switching elements 42, gate lines 43, and data lines 44 are provided in the photoelectric conversion elements 41, respectively. Each of the gate lines 43 and each of the data lines 44 are provided to extend to a connection terminal 45, and are connected to the circuit board of the control module 50 (FIG. 1) via a flexible wiring 46 connected to the connection terminal 45 such as an anisotropic conductive film. The switching elements 42 are switched ON/OFF line by line by a control signal transmitted via the gate line 43 from the control unit mounted in the circuit board, and electric charges of the photoelectric conversion element 41 of which the switching element 42 is placed in the "ON" state are read out as an image signal by the signal processing unit of the circuit board via the data line 44. As the electric charges of the photoelectric conversion elements 41 are sequentially read out line by line, a two-dimensional image is detected.

In addition, in the above described configuration, the gate lines 43 and data lines 44 are provided to extend to be orthogonal to each other. However, the gate lines 43 and the data lines 44 may be provided to extend to be parallel to each other and connected to a connecting terminal disposed a side of the peripheral ends of the sensor board 400.

The gate lines 43, the data lines 44, the switching elements 42, and the photoelectric conversion elements 41 as described above are formed on the scintillator panel 10 side surface of the insulating substrate 401. The gate lines 43, the data lines 44, the switching elements 42, and the photoelectric conversion elements 41 are sequentially formed on the insulating substrate 401 by, for example, a photo etching process. In FIG. 2, the surface of the sensor board 400 is flattened by a resin film 47 provided on the outermost layer of the sensor board 400. However, the resin film 47 may be omitted. The sensor board 400 and the scintillator panel 10 are bonded to each other through an adhesive layer 48.

Also, the adhesive layer 48 or the resin film 47 may not exist between the sensor board 400 and the scintillator panel 10, and the scintillator panel 10 and the surface of the sensor board 400 may be opposed to each other to be directly in close contact with each other.

Also, as in the examples described below (FIG. 8 and FIG. 9), the scintillator may be formed on the sensor board 400 by deposition.

3. CONFIGURATION OF SCINTILLATOR PANEL

[3-1. Overall Configuration]

The scintillator panel 10, as illustrated in FIG. 1, includes a support (substrate) 101, the scintillator 200 vapor-deposited on the support 101 by a vapor deposition method, and a protective film (moisture proof film) 30 of, for example, parylene, which covers and seals the scintillator 200 on the support 101. The protective film of parylene formed by a vapor deposition method has a good adhesion characteristic with the scintillator 200, and also has flexibility, thereby showing a good conformability with the warping or the like in the support 101.

The support 101 is formed as a plate using a material that has a high X-ray transmissivity and reflects light, such as, for example, Al.

The support 101 is not limited to the plate made of Al and may be properly selected from, for example, a carbon plate, a carbon fiber reinforced plastic (CFRP), a glass plate, a quartz substrate, a sapphire substrate and the like, but not particularly limited thereto as long as the scintillator 200 may be allowed to be formed on the support surface. However, when the support 101 also serves as a reflective member of light, it is preferable to use a light metal such as Al as a material for the support.

The scintillator 200 is formed using CsI:Tl (thallium-activated cesium iodide) as a fluorescent material in the present exemplary embodiment, but may be formed using other materials, for example, NaI:Tl (thallium-activated sodium iodide), CsI:Na (sodium-activated cesium iodide). Also, due to the fact that the emission spectrum is suitable for the maximum value (around 550 nm) of the spectral sensitivity of a-Si photodiode, and deterioration with elapse of time due to humidity hardly occurs, it is preferable to use CsI:Tl as a material to form the scintillator 200.

Figure 4:
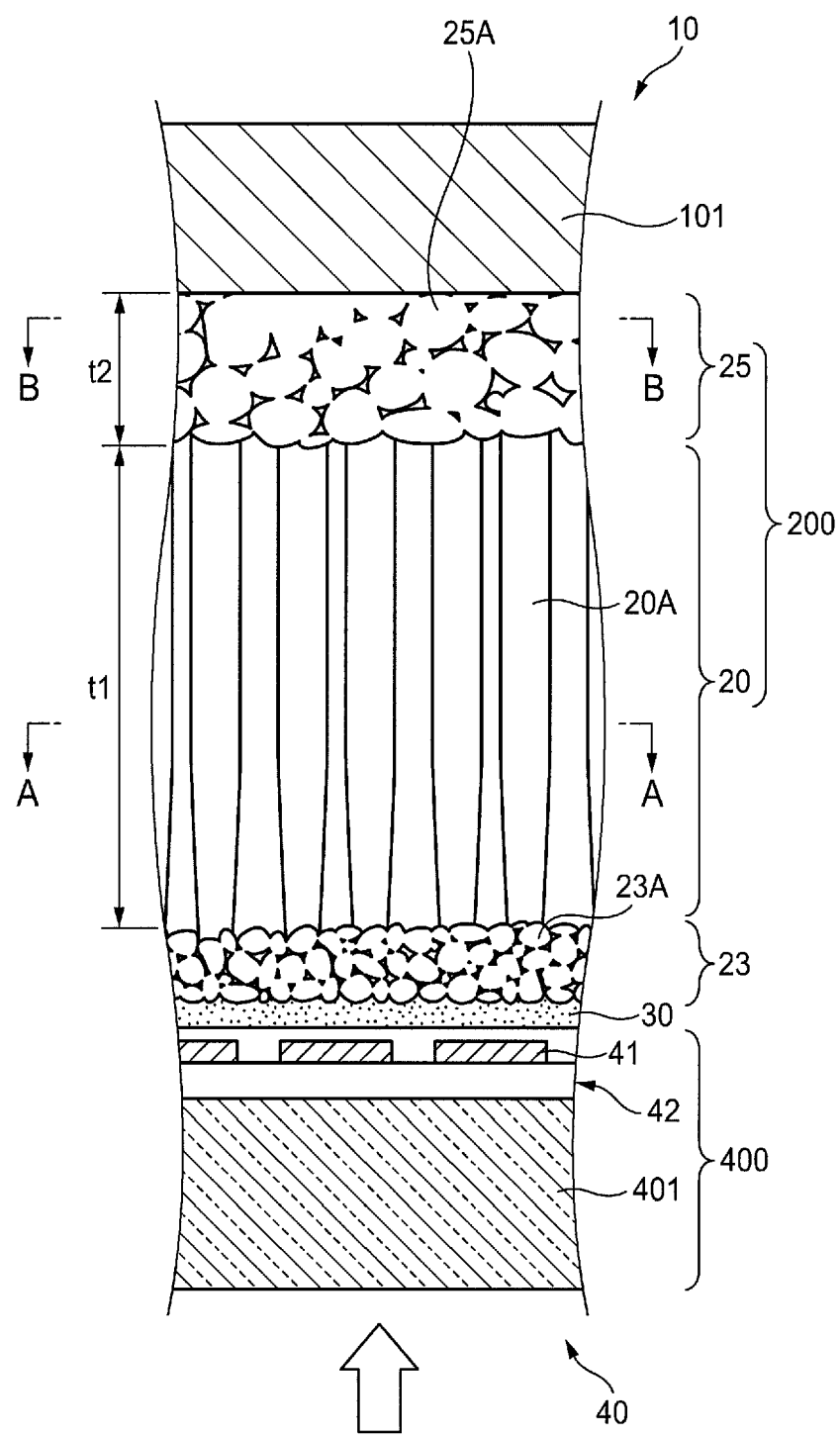
FIG. 4 is a side sectional view schematically illustrating a scintillator having a columnar section, a first non-columnar section, and a second non-columnar section.

FIG. 4 is a side sectional view schematically illustrating the structure of the scintillator 200. The scintillator 200 includes a columnar section 20 formed by a group of columnar crystals 20A obtained through columnar growth of crystals of a fluorescent material, a first non-columnar section 23 provided at the photodetector 40 side of the columnar section 20, and a non-columnar section 25 provided at the opposite side to the first non-columnar section 23 side of the columnar section 20, that is, between the columnar section 20 and the support 101. In the scintillator 200, the first non-columnar section 23 is disposed at the X-ray entrance side indicated by the outline arrow, and the second non-columnar section 25 is disposed at the opposite side to the X-ray entrance side.

The fluorescence emitted from the scintillator 200 by irradiation of X-rays is guided in the columnar height direction by the columnar crystals 20A, and then is incident on the photodetector 40. Here, a part of the light traveling toward the support 101 side is reflected by the support 101 and is incident on the photodetector 40.

[3-2. Configuration of Columnar Section]

The columnar section 20 is an aggregate of plural columnar crystals 20A. In the example illustrated in FIG. 4, each of the columnar crystals 20A is erect substantially perpendicular to the support 101. Each of the columnar crystals 20A of this example has a tapered shape at the front end portion side. The front end portion of each of the columnar crystals 20A may be flattened through a polishing. The front end portions of plural columnar crystals 20A face one pixel (photoelectric conversion element 41) of the photodetector 40.

Figure 5:
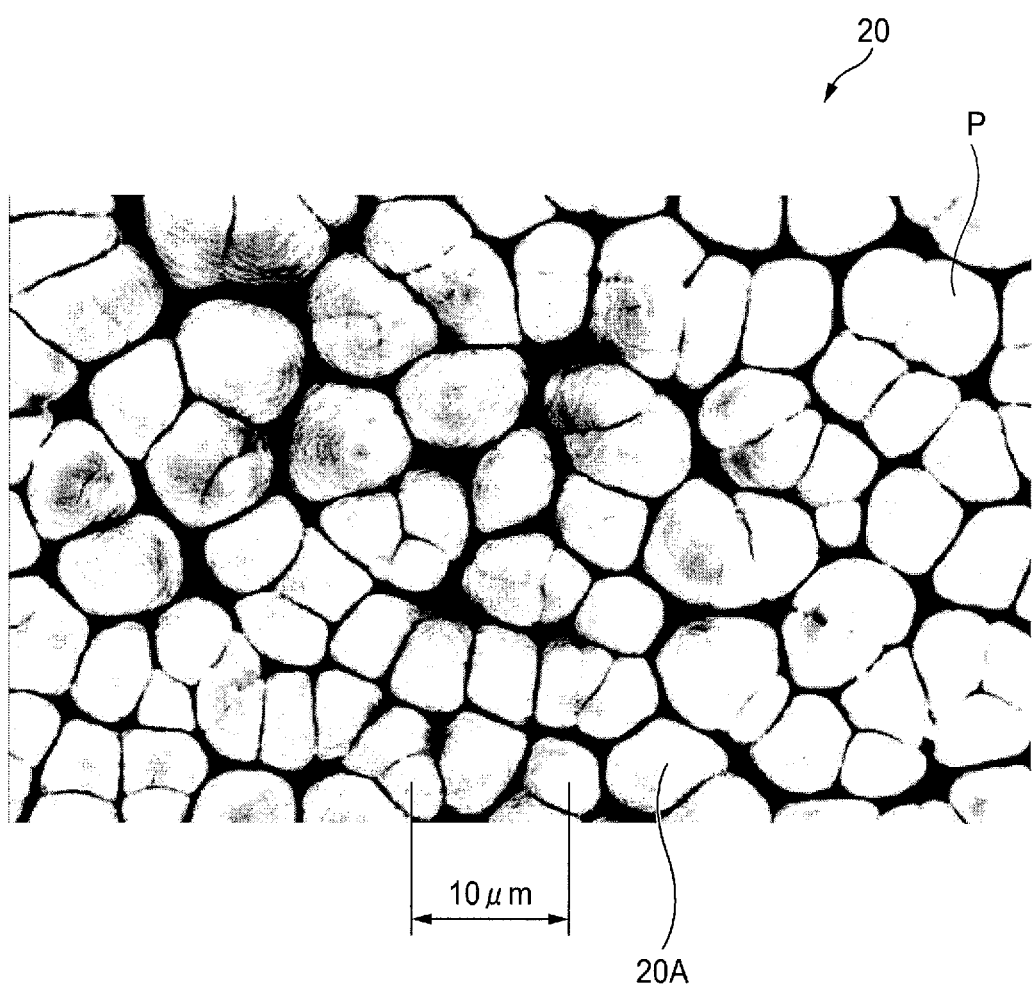
FIG. 5 is an electron micrograph (SEM image) illustrating a columnar crystal cross section of a columnar section.

FIG. 5 is an electron micrograph of the columnar section 20 in A-A cross-section of FIG. 4 (the cross section around the center in the height direction of the columnar section 20). Between adjacent columnar crystals 20A, gaps exists (the parts that looks darker in FIG. 5). The columnar crystals 20A have substantially uniform cross-sectional diameters in the crystal growth direction. In a part of the columnar section 20, adjacent columnar crystals 20A may be bonded to each other to integrally form a columnar body (e.g., P in FIG. 5).

The diameter (cross-sectional diameter) of the columnar crystals 20A is 2 μm or more and 8 μm or less, but more preferably 6 μm or more and 8 μm or less in the viewpoint of providing an efficient light guide property. If the diameter of the columnar section 20 is too small, the shock resistance is reduced. Thus, it is preferable that the diameter of the columnar section 20 is 2 μm or more. In addition, if the crystal diameter is excessively large, the number of the columnar crystals 20A per each pixel of the photodetector 40 is reduced. Thus, it becomes highly probable that a defect occurs in the signal of the pixel when a crack occurs in a columnar crystal 20. For this reason, it is preferable that the diameter of the columnar section 20 is 8 μm or less.

In addition, the crystal diameter of the columnar crystal 20A refers to a maximum diameter of a crystal observed from the top side in the growing direction of the columnar crystal 20A. In a specific measuring method, the columnar diameter (cross-sectional diameter) is measured by observation from a plane perpendicular to the height direction of the columnar crystals 20A with an SEM (scanning electron micrograph). Observation is performed with a magnification (about 2,000×) that allows 100 to 200 columnar crystals 20A to be observed when the scintillator panel 10 is viewed from the surface (the surface opposite to the support) at one shot. A value obtained by measuring and taking an average on the maximum values of the columnar diameters obtained by scanning in the height direction for all the crystals included at the one shot is employed. The columnar diameters (μm) are read to two decimal places, and the average value is determined by rounding off to one decimal place in accordance with JISZ8401.

In addition, the thickness of the columnar section 20 may be determined to be 500 μm or more in consideration of the X-ray absorption power corresponding to a desired sensitivity. However, when the thickness of the columnar section 20 is too thick, the luminance efficiency may be easily degraded due to the attenuation and scattering of light. For this reason, the thickness of the columnar section may be determined as a proper value considering each of the sensitivity and luminance efficiency.

[3-3. Configuration of Non-Columnar Section]

(1) Configuration of First Non-Columnar Section

The first non-columnar section 23, as illustrated in FIG. 4, is configured to include (a group of) the non-columnar crystals 23A in substantially spherical or indeterminate irregular shapes. Also, the first non-columnar section 23 may include an amorphous part.

In the first non-columnar section 23, the non-columnar crystals 23A having a smaller diameter than the columnar crystals 20A in FIG. 5 are irregularly bonded to or overlapped with each other, and a clear gap between crystals is hardly confirmed. For this reason, many of the non-columnar crystals 23A may be fused to each other, in the thickness direction of the first non-columnar section 23, or in the in-plane direction perpendicular to the thickness direction. Also, when the first non-columnar section 23 includes the amorphous part, the non-columnar crystals 23A and the amorphous part may be fused to each other in the thickness direction or in the in-plane direction.

The thickness of the first non-columnar section 23 is preferably 3 μm or more and 50 μm or less. In order to securely cover the front end portion in the crystal growth direction of the columnar section 20 (at least between the columnar crystals 20A and 20A) and then to flatten the surface of the scintillator 200, the thickness of the first non-columnar section 23 is preferably 3 μm or more. Also, if the thickness of the first non-columnar section 23 having no light guide effect is excessively thick, light in the first non-columnar section 23 may be interlaced between pixels so that image blur may easily occur. Thus, the thickness of the first non-columnar section 23 is preferably 50 μm or less.

Also, a minimum thickness capable of securely covering the front end portion of the columnar section 20 is sufficient for the thickness of the first non-columnar section 23. That is, as the thickness of the first non-columnar section 23 is decreased, the used amount of an expensive fluorescent material may be reduced, thereby resulting in cost reduction.

Since the thickness of the first non-columnar section 23 is thin, for example, attenuation or scattering of the light emitted from the columnar crystals 20A in the first non-columnar section 23 may be ignored.

Also, the first non-columnar section 23 may have a structure where a plurality of layers are laminated, instead of a single layer, according to, for example, a condition, during manufacturing. In such a case, the thickness of the first non-columnar section 23 refers to the thickness from the front end portion in the crystal growth direction of the columnar crystals 20A to the surface of the outermost layer of the first non-columnar section 23.

The porosity of the first non-columnar section 23 is calculated based on, for example, the area in plan view of the first non-columnar section 23, the thickness of the first non-columnar section 23, CsI density, and the actually measured weight of the scintillator panel 10. The porosity in the entire thickness direction of the first non-columnar section 23, as calculated in this manner, is 10% or less. Also, the porosity of the first non-columnar section 23 may be determined in consideration of the thickness of the first non-columnar section 23.

In the example illustrated in FIG. 4, the crystal diameter of the first non-columnar section 23 is smaller than that of the second non-columnar section 25, but is not limited thereto.

The non-columnar crystals 23A of the first non-columnar section 23 may employ a wider range of diameters than an applicable range (described later) of crystal diameters of the second non-columnar section 25. It is preferable that the substantially spherical non-columnar crystals 23A have a very small diameter and a porosity approaching 0, in the sense that the front end portion of the columnar section 20 is covered with the first non-columnar section 23. Also, in the same sense as described above, it is preferable that the non-columnar crystals 23A are bonded to each other so as to obtain a larger diameter and a porosity approaching 0. Accordingly, in the first non-columnar section 23, the crystal diameter may be determined as an appropriate diameter, as long as it is not an excessively large diameter allowing the flatness of the scintillator surface to be lost.

Such a first non-columnar section 23, at the front end portion of the growth direction of the columnar section 20, is covered at least between the columnar crystals 20A. By this, the scintillator 200 is flattened at the portion facing the sensor board 400. The above described protective film 30 covers the surface of the first non-columnar section 23. Through the protective film 30, the scintillator 200 is in close contact with the sensor board 400.

(2) Configuration of Second Non-Columnar Section

The second non-columnar section 25, as illustrated in FIG. 4, is configured to include (a group of) the non-columnar crystals 25A in substantially spherical or indeterminate shapes. Also, the second non-columnar section 25 may include an amorphous part.

The non-columnar crystals 25A are preferably substantially spherical in shape from the viewpoint of allowing a gap between the crystals to be easily maintained, and reflecting efficiency to be increased. That is, the second non-columnar section 25 is preferably configured as an aggregation of nearly spherical crystals (the non-columnar crystals 25A as substantially spherical crystals).

Figure 6:
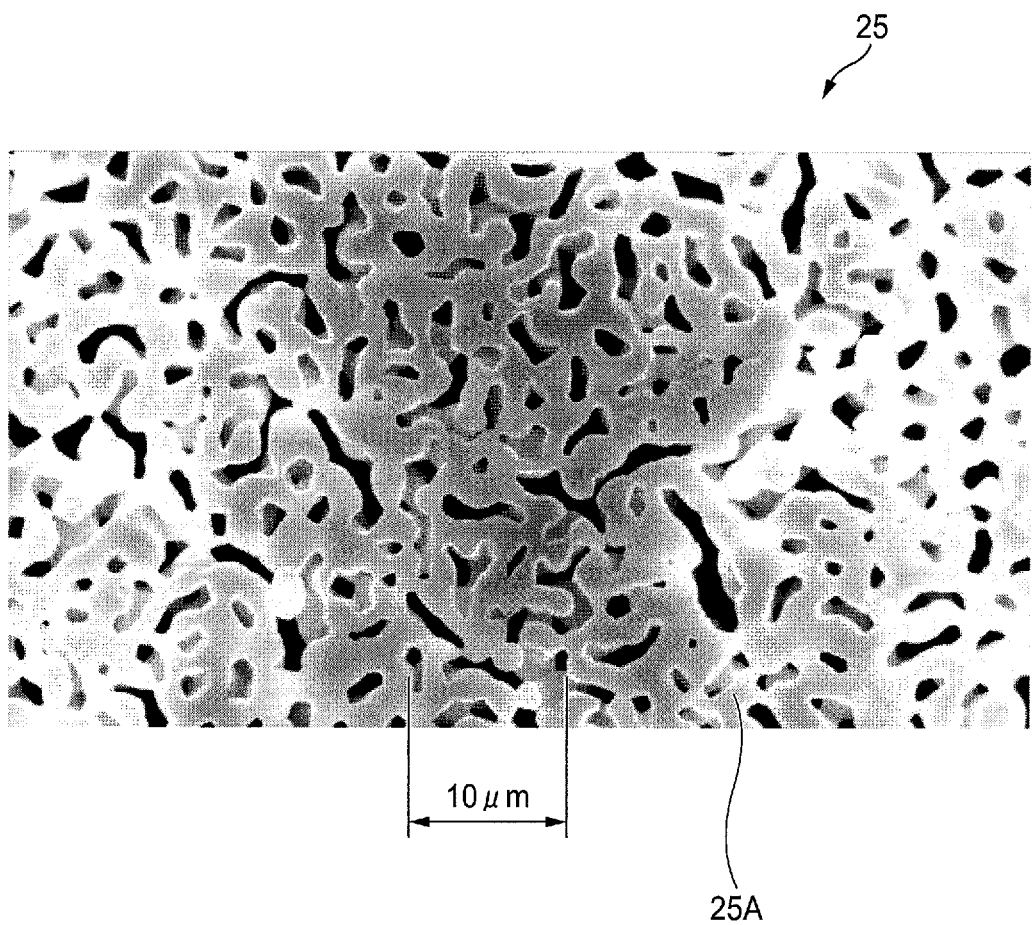
FIG. 6 is an electron micrograph (SEM image) illustrating a cross section of a non-columnar section.

FIG. 6 is an electron micrograph illustrating the second non-columnar section 25 in the B-B cross section (cross section at the base end side in the thickness direction of the second non-columnar section 25) of FIG. 4. In the second non-columnar section 25, the non-columnar crystals 25A having a smaller diameter than the columnar crystals 20A in FIG. 5 are irregularly bonded to or overlapped each other, and a clear gap between the crystals is hardly confirmed. For this reason, many of the non-columnar crystals 25A may be fused to each other, in the thickness direction of the second non-columnar section 25, or in the in-plane direction perpendicular to the thickness direction. Also, when the second non-columnar section 25 includes the amorphous part, the non-columnar crystals 25A and the amorphous part may be fused to each other in the thickness direction or in the in-plane direction. The gap in FIG. 6 is smaller than that in FIG. 5. From the observation results of FIGS. 5 and 6, the porosity of the second non-columnar section 25 is lower than that of the columnar section 20.

The porosity of the second non-columnar section 25 is calculated based on, for example, the deposition area of the second non-columnar section 25 on the support 101, the thickness of the second non-columnar section 25, CsI density, and the actually measured weight of the scintillator panel 10.

The second non-columnar section 25 is formed at the initial stage of vapor deposition on the support 101, and the porosity of the portion of the second non-columnar section 25 which is in contact with the surface of the support 101 is 0 or substantially 0. For this reason, the base end portion of the second non-columnar section 25 is in close contact with the support 101 over the entire contact surface with the support 101.

The thickness of the second non-columnar section 25 is preferably 5 μm or more and 125 μm or less. In order to secure the adhesion with the support 101, the thickness of the second non-columnar section 25 is preferably 5 μm or more. Also, if the thickness of the second non-columnar section 25 having no light guide effect is excessively thick, light in the second non-columnar section 25 may be interlaced between pixels so that image blur may easily occur. Thus, the thickness of the second non-columnar section 25 is preferably 125 μm or less.

Also, a minimum thickness capable of achieving the adhesion with the support 101 and the reflective function of light is sufficient for the thickness of the second non-columnar section 25. That is, as the thickness of the second non-columnar section 25 is decreased, the used amount of an expensive fluorescent material may be reduced, thereby resulting in cost reduction.

Also, the second non-columnar section 25 may have a structure where a plurality of layers are laminated, instead of a single layer, according to, for example, a condition, during manufacturing. In such a case, the thickness of the second non-columnar section 25 refers to the thickness from the surface of the support 101 to the surface of the outermost layer of the second non-columnar section 25.

In a case where crystals are coalescent to each other like those in the second non-columnar section 25, the crystal diameter is measured as follows. A line connecting concave portions (recesses) occurring between the adjacent non-columnar crystals 25A is considered as a grain boundary between the crystals, and the crystal diameter is measured by separating the coalescent crystals to be the smallest polygons. Then, the average value thereof is determined and is employed, in the same manner as the diameter of the columnar crystals 20A in the columnar section 20.

The diameter of the non-columnar crystals 25A of the second non-columnar section 25 is preferably 0.5 µm or more and 7.0 µm or less from the viewpoint of giving the efficient reflective property, and the adhesion with the support 101. The diameter of the non-columnar crystals 25A is smaller than that of the columnar crystals 20A.

Here, it is preferable that the diameter of the non-columnar crystals 25A is small because the substantially spherical crystal shape may be easily maintained. However, when the diameter of the non-columnar crystals 25A is too small, the porosity approaches 0, and the second non-columnar section 25 may not serve as a reflecting layer of light. Thus, the diameter of the non-columnar crystals 25A is preferably 0.5 µm or more. Also, when the diameter is too large, the flatness and surface area of the second non-columnar section 25 may be reduced, and the adhesion with the support 101 may be reduced. At the same time the porosity is lowered due to the bonding of the crystals to each other, thereby reducing the reflecting effect. Thus, the crystal diameter of the second non-columnar section 25 is preferably 7.0 µm or less.

As described above, in consideration of the reflecting characteristic of the second non-columnar section 25, the shape, the diameter, and the porosity of the crystals included in the second non-columnar section 25 are preferably determined such that the crystal shape employs a substantially spherical shape, the porosity is greater than 0 and not more than 10%, and the diameter is within an appropriate range with regard to the porosity (0.5 µm or more and 7.0 µm or less as described above).

In the second non-columnar section 25, as the ratio of the substantially spherical crystals is increased, the gap between the overlapped crystals may be easily maintained. Thus, it is easy to secure the reflecting effect. It is preferable that the crystal diameter is small because the crystal shape may be easily maintained to be substantially spherical. However, when the diameter is excessively small to be less than 0.5 µm, the porosity approaches 0. Thus, it becomes difficult to achieve the reflecting effect.

Also, when the crystal diameter is excessively large, the substantially spherical crystals are bonded to each other to become an indeterminate shape, and the gap between the crystals is reduced, thereby lowering the reflecting effect.

That is, it is preferable that the diameter of the non-columnar crystals 25A and the porosity of the second non-columnar section 25 are respectively determined from the viewpoint of maintaining the substantially spherical crystal shape, and also maintaining a predetermined gap capable of achieving the reflecting characteristic. Also, when the porosity of the second non-columnar section 25 is determined, the thickness of the second non-columnar section 25 may be taken into consideration.

(3) Comparison of Configuration of First Non-Columnar Section to Second Non-Columnar Section It is desirable that the porosity of the first non-columnar section 23 is 10% or less as described above, and the porosity of the first non-columnar section 23 is lower than that of the second non-columnar section 25. The porosity of the second non-columnar section 25 is 0 or substantially 0 at the portion where the second non-columnar section 25 is in contact with the support 101. However, when the porosity in the entire thickness of the second non-columnar section 25 is compared to the porosity of the first non-columnar section 23, the porosity of the first non-columnar section 23 is lower than that of the second non-columnar section 25. That is, it is desirable that the first non-columnar section 23 provided at the sensor board 400 side is thin in the sense of suppressing the attenuation, scattering or the like of light, and it is desirable that the porosity is low so that the first non-columnar section 23 may cover the front end portion of the columnar section 20 to flatten the scintillator 200 even if the first con-columnar section 23 is thin. Also, in the sense of suppressing inflow of the material of the protective film 30 into between the columnar crystals 20A, it is desirable that the porosity of the first non-columnar section 23 is small, for example, 10% or less.

Also, it is desirable that the thickness of the first non-columnar section 23 is 3 µm or more and 50 µm or less as described above and smaller than that of the second non-columnar section 25. As described above, it is desirable that the thickness of the first non-columnar section 23 is sufficiently thin to securely cover the front end portion of the columnar section 20.

The scintillator 200 including the columnar section 20, the first non-columnar section 23, and the second non-columnar section 25 as described above may be formed on the support 101 by a vapor deposition method as described below. Also, the second non-columnar section 25, the columnar section 20, and the first non-columnar section 23 may be formed in this order successively in time, and may be respectively formed at time intervals.

On the support 101, the second non-columnar section 25 is formed under predetermined conditions including a degree of vacuum and a support temperature, and then these conditions are varied so that the columnar crystals 20A start to grow. The columnar section 20 is erect from the surface portion of the second non-columnar section 25. In this manner, the columnar section 20 is grown based on the second non-columnar section 25, which improves the crystallinity of the columnar section 20.

After the columnar crystals 20A are grown up to a predetermined height, the conditions including the degree of vacuum and the support temperature are varied again so that the first non-columnar section 23 is formed on the columnar section 20.

Herein, the thickness of the columnar section 20 is compared to that of the second non-columnar section 25. As illustrated in FIG. 4, when the thickness of the columnar section 20 is set as t1, and the thickness of the second non-columnar section 25 is set as t2, it is desirable that the relationship between t1 and t2 satisfies the equation below.

$$0.01 \leq (t2/t1) \leq 0.25 \quad \text{(Equation)}$$

When the thickness t1 of the columnar section 20, and the thickness t2 of the second non-columnar section 25 satisfy the equation above, in the scintillator 200, the light emission efficiency in each part in the thickness direction, and a region of preventing light diffusion and a region of reflecting light may be placed in appropriate ranges, respectively. Also, the emission efficiency of light, the detection efficiency of light, and the definition of an image are improved. When the thickness t2 of the second non-columnar section 25 is too thick, there is a possibility that a region with a low light emission efficiency is increased, thereby lowering the sensitivity. From this viewpoint, it is more desirable that (t2/t1) is within a range of 0.02 or more and 0.1 or less.

As for the photodetector 40 and the scintillator panel 10 as described above, for example, an organic photoelectric conversion material (OPC), an organic TFT, a TFT using an amorphous oxide (e.g., a-IGZO), or a flexible material (aramid, bio nanofiber) may be used. These device-related materials will be described later.

4. OPERATION AND EFFECT ON COLUMNAR SECTION AND NON-COLUMNAR SECTION

Hereinafter, main acting effects of the columnar section 20, the first non-columnar section 23, and the second non-columnar section 25 will be described.

The columnar section 20 is excellent in crystallinity and high in light emission efficiency of fluorescence as compared to the first non-columnar section 23 or the second non-columnar section 25. Also, since the columnar crystals 20A which have a columnar crystal shape are adjacent to each other via a gap, are provided to stand in the thickness direction of the support 101, the columnar crystals 20A serve as a guide for light and guide the light in the columnar height direction. Here, with respect to the second non-columnar section 25 and the columnar section 20 that contribute to the optical property of the scintillator 200, since the columnar section 20 is disposed at the X-ray entrance side and at the position close to the photodetector 40 in the scintillator 200, X-rays that are hardly attenuated immediately after passing through the sensor board 400 are incident on the columnar section 20 to be converted into light. Then, the fluorescence is rapidly incident on the photodetector 40, thereby increasing the amount of light incident on the photodetector 40. That is, the available luminescence amount of the scintillator 200 may be increased. Since this and the light guide effect by the columnar crystals 20A may suppress the light diffusion between pixels, a detected image may be sharpened.

Meanwhile, the second non-columnar section 25 which has granular crystals having a smaller diameter than the columnar crystals 20A, and a predetermined gap having a lower porosity than the columnar section 20 reflects the light that is mainly emitted from the columnar section 20 and travels toward the support 101, toward the photodetector 40. The reflection of the light by the second non-columnar section 25 contributes to the improvement in efficiency of using the light emitted from the scintillator 200 together with the reflection of the light by the support 101. Accordingly, since the quantity of light incident on the photodetector 40 and used for image detection is increased, the detected image may be further sharpened. Also, since the second non-columnar section 25 has a reflecting characteristic of light, the support may be formed of a material having a low light reflectivity such as glass, carbon or the like.

Also, in the scintillator panel 10, the support 101 may not be provided. That is, the scintillator 200 may be formed by deposition using a vapor deposition substrate, and then the scintillator 200 may be peeled off from the substrate and used.

Furthermore, since at the photodetector 40 side of the columnar section 20, the first non-columnar section 23 is provided and covers the front end portion of each of the columnar crystals 20A, the scintillator 200 is flattened at the portion at the sensor board 400 side. Accordingly, the protective film 30 is not torn by the front end portions of the columnar crystals 20A and the airtightness by the protective film 30 may be maintained. Also, it is possible to suppress the performance of the scintillator 200 from being degraded by deliquescence of the scintillator 200.

Also, as the scintillator 200 is flattened, the scintillator 200 may come into close contact with the sensor board 400 through the protective film 30. If unevenness occurs in the adhesion with the sensor board 400, a stain may easily appear in the detected image. However, without such a thing, the image quality of the detected image may become uniform.

Further, by securing the adhesion between the scintillator 200 and the sensor board 400 as described above, the external force added to the scintillator 200 during, for example, drop shock is buffered by the sensor board 400. Thus, the shock resistance may be improved. Especially, in a case where the X-ray image detection apparatus 1 is bonded to a device case, the scintillator 200 may be hardly damaged even if a load is applied from the device case.

Also, by securing the adhesion with the sensor board 400, it is possible to suppress the scintillator 200 from being peeled off from the sensor board 400 due to a difference in the quantity of thermal expansion.

Figure 7:
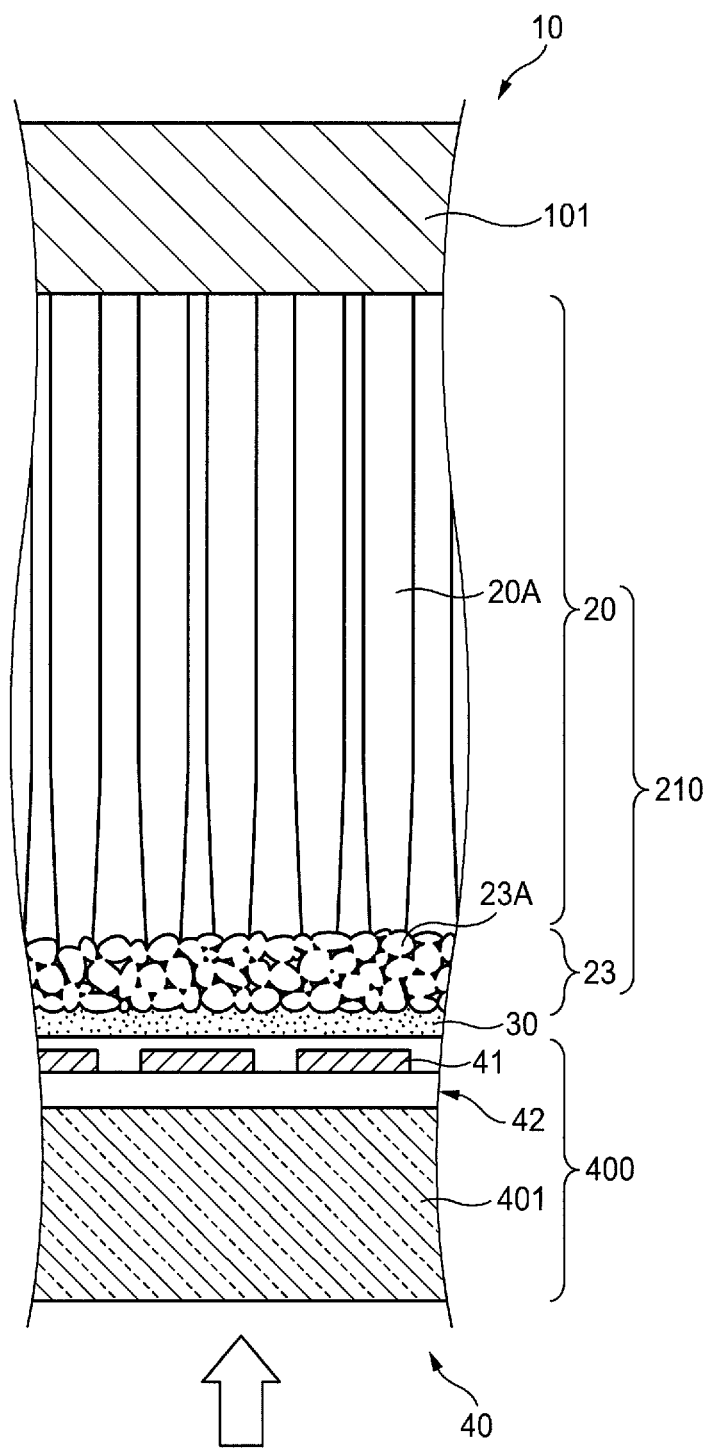
FIG. 7 is a side sectional view schematically illustrating a scintillator having a columnar section, and a first non-columnar section.

As described above, in the X-ray image detection apparatus 1, the adhesion between the sensor board 400 and the scintillator 200 may be secured by providing the first non-columnar section 23. Meanwhile, when the second non-columnar section 25 is provided at the support 101 side, the scintillator 200 may have the reflecting characteristic. A configuration free of the second non-columnar section 25 will be described below (FIG. 7).

Also, by the first non-columnar section 23, a material such as parylene may be suppressed from entering between the columnar crystals 20A during formation of the protective film 30 (FIG. 1). When the parylene or the like enters the gap between the columnar crystals 20A, a refractive index difference in the region between the columnar crystal 20A and its adjacent columnar crystal 20A is decreased, thereby increasing the critical angle of light. Thus, the light guidance performance in the thickness direction by the columnar crystals 20A is degraded. Specifically, the light guidance performance of the columnar crystals 20A may be lowered because the critical angle is 34° since the refractive index of CsI is 1.8 and the refractive index of air of 1 while the critical angle becomes 56° since the refractive index of CsI is 1.8 and the refractive index of parylene is 1.5. The formation of the first non-columnar section 23 may suppress the occurrence of such a problem.

Further, by interposing the second non-columnar section 25 between the columnar section 20 and the support 101, it is possible to improve the adhesion with the support 101. That is, since the flatness and the surface area of the scintillator 200 at the portion facing the support 101 are increased as compared to a configuration where the columnar section 20 is directly formed on the surface of the support 101, the adhesion with the support 101 is improved. Accordingly, it is possible to suppress the scintillator 200 from being peeled off from the support 101 due to a difference in the quantity of thermal expansion (difference in the heat conductivity) between the support 101 and the scintillator 200. This is very effective in the X-ray image detection apparatus 1 where the control module 50 provided at the opposite side to X-ray entrance side may easily propagate heat on the support 101 disposed at the opposite side to X-ray entrance side in the same manner.

Since both of the adhesion with the sensor board 400, and the adhesion with the support 101 are secured by the first non-columnar section 23 and the second non-columnar section 25, respectively, the peel strength from the sensor board 400 and the support 101 is improved and thus, the strength of the entire scintillator panel 10 is improved.

According to the X-ray image detection apparatus 1, an X-ray image may be detected with a high sensitivity and a high definition and concurrently, the reliability may be improved through the improvement of the adhesion of the scintillator 200 with the sensor board 400 and with the support 101.

The X-ray image detection apparatus 1 as described above may be used in a state where it is mounted within various devices such as an X-ray imaging device for medical use.

Especially, in a mammography device that requires the detection of a sharp image at a low radiation irradiation dose, the X-ray image detection apparatus 1 according to the present exemplary embodiment which has characteristics of a high sensitivity, and a high definition may be appropriately used. Further, when the X-ray image detection apparatus 1 is configured as a portable cassette detachable to an X-ray imaging device, it is highly probable that the X-ray image detection apparatus 1 may be subject to drop shock, and it is important to secure shock resistance of the scintillator 200 by bringing the sensor board 400 into close contact with the support 101. Thus, the above described effect of improving the adhesion with each of the sensor board 400 and the support 101 is advantageous.

Also, the X-ray image detection apparatus 1 has a wide application range thereof since it may be used not only in the X-ray imaging device for medical use, but also in, for example, an X-ray imaging device for industrial use for a non-destructive test, or as a device for detecting corpuscular beams (α rays, β-rays, γ rays) besides electromagnetic waves.

5. MODIFIED EXAMPLE

Also, although in the above described example, the scintillator 200 is provided with the second non-columnar section 25 (FIG. 4), the second non-columnar section 25 may not be provided as illustrated in FIG. 7. A scintillator 210 illustrated in FIG. 7 has a columnar section 20 and a first non-columnar section 23. In such a configuration, the light mainly emitted from the columnar section 20 is reflected toward the sensor board 400 by a support 101 formed as a reflective member made of Al or the like.

Figure 8:
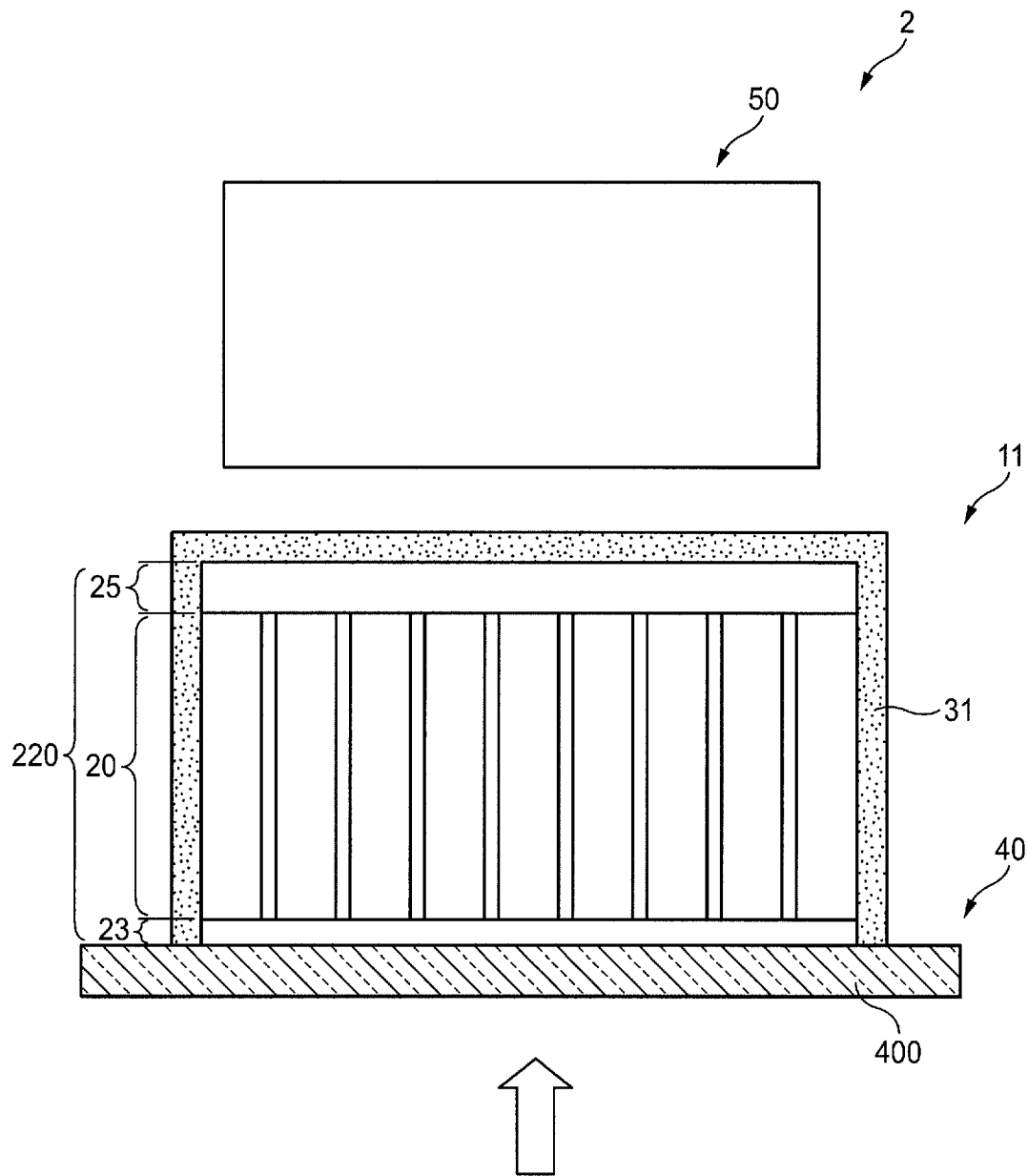
FIG. 8 is a side sectional view schematically illustrating the configuration where a scintillator is directly vapor-deposited on a sensor board.
Figure 9:
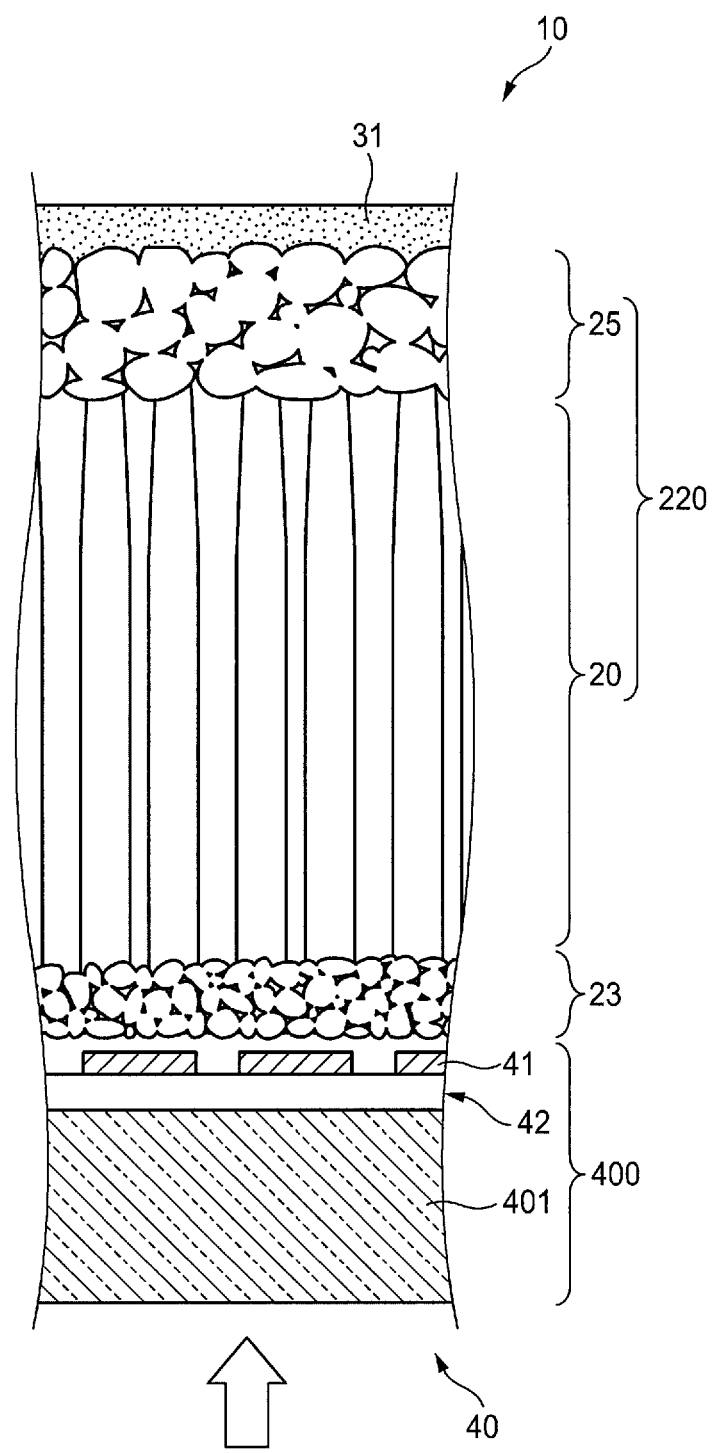
FIG. 9 is a side sectional view schematically illustrating the scintillator in the configuration of FIG. 8.

FIGS. 8 and 9 illustrate an example where a scintillator is directly vapor-deposited on the sensor board. An X-ray image detection apparatus 2 in FIG. 8 is provided with a photodetector 40 and a scintillator 220 integrally formed on a sensor board 400 of the photodetector 40. The scintillator 220 does not have a support, and is formed by vapor deposition on the sensor board 400. A protective film that covers the scintillator 220 seals the scintillator 220 on the sensor board 400.

FIG. 9 is a schematic view illustrating the configuration of the scintillator 220. On the sensor board 400, a first non-columnar section 23, a columnar section 20, and a second non-columnar section 25 are sequentially formed by a vapor deposition method. In the configuration of FIG. 9, the light that is mainly emitted from columnar crystals 20A and travels toward the opposite side to the sensor board 400 side is reflected toward the sensor board 400 by the second non-columnar section 25. Also, the second non-columnar section 25 may suppress the inflow of a material for the protective film into between the columnar crystals 20A.

Here, the first non-columnar section 23 is formed at the initial stage of vapor deposition on the sensor board 400, and the porosity of the first non-columnar section 23 at the portion in contact with the outermost layer of the sensor board 400 is 0 or substantially 0. For this reason, the base end portion of the first non-columnar section 23 is in close contact with the sensor board 400 over the entire contact surface with the sensor board 400.

Here, in the same manner as described in the configuration FIGS. 1 to 6, the formation of the first non-columnar section 23 increases the surface area of the portion of the scintillator 200 facing the sensor board 400 (the area in contact with the sensor board 400 in the example of FIGS. 8 and 9), and also flattens the surface of the scintillator, thereby improving the adhesion of the sensor board 400 with the scintillator. However, in the configuration (direct deposition) in FIGS. 8 and 9, since the scintillator is formed by vapor deposition on an insulating substrate 401 (in general, glass) that is poor in adhesion with the scintillator as compared to Al or the like, a higher adhesion is required between the scintillator and the sensor board 400. That is, the adhesion of the scintillator with a glass substrate is not excellent since the glass substrate has a low heat conductivity as compared to Al or the like. In this sense, the effect of securing the adhesion of the scintillator 220 with the sensor board 400 through the formation of the first non-columnar section 23 is higher than a case where the scintillator panel 10 is bonded to the sensor board 400 using the support 101 made of Al as a vapor deposition substrate for the scintillator 200 (FIGS. 1 to 6).

6. APPLICABLE DEVICE MATERIAL

[6-1. Organic Photoelectric Conversion (OPC) Material]

For example, any OPC (Organic Photoelectric Conversion) material disclosed in JP-A-2009-32854 can be used for the aforementioned photoelectric conversion elements 41 (FIG. 2). A film formed out of the OPC material (hereinafter referred to as OPC film) can be used as the photoconductive layers 410 of the photoelectric conversion elements 41. The OPC film contains an organic photoelectric conversion material, which absorbs light emitted from the scintillator and generates electric charges corresponding to the absorbed light. Thus, the OPC film containing the organic photoelectric conversion material has a sharp absorption spectrum in a visible light range. Electromagnetic waves other than the light emitted by the scintillator are hardly absorbed by the OPC film. Thus, noise generated by radioactive rays such as X-rays absorbed by the OPC film can be suppressed effectively.

It is preferable that the absorption peak wavelength of the organic photoelectric conversion material forming the OPC film is closer to the peak wavelength of light emitted by the scintillator in order to more efficiently absorb the light emitted by the scintillator. Ideally, the absorption peak wavelength of the organic photoelectric conversion material agrees with the peak wavelength of the light emitted by the scintillator. However, if the difference between the absorption peak wavelength of the organic photoelectric conversion material and the peak wavelength of the light emitted by the scintillator is small, the light emitted by the scintillator can be absorbed satisfactorily. Specifically, the difference between the absorption peak wavelength of the organic photoelectric conversion material and the peak wavelength of the light emitted by the scintillator in response to radioactive rays is preferably not larger than 10 nm, more preferably not larger than 5 nm.

Examples of the organic photoelectric conversion material that can satisfy such conditions include arylidene-based organic compounds, quinacridone-based organic compounds, and phthalocyanine-based organic compounds. For example, the absorption peak wavelength of quinacridone in a visible light range is 560 nm. Therefore, when quinacridone is used as the organic photoelectric conversion material and CsI(Tl) is used as the scintillator material, the aforementioned difference in peak wavelength can be set within 5 nm so that the amount of electric charges generated in the OPC film can be increased substantially to the maximum.

At least a part of an organic layer provided between the bias electrode 411 and the charge collection electrode 412 can be formed out of an OPC film. More specifically, the organic layer can be formed out of a stack or a mixture of a portion for absorbing electromagnetic waves, a photoelectric conversion portion, an electron transport portion, an electron hole transport portion, an electron blocking portion, an electron hole blocking portion, a crystallization prevention portion, electrodes, interlayer contact improvement portions, etc.

Preferably the organic layer contains an organic p-type compound or an organic n-type compound. An organic p-type semiconductor (compound) is a donor-type organic semiconductor (compound) as chiefly represented by an electron hole transport organic compound, meaning an organic compound having characteristic to easily donate electrons. More in detail, of two organic materials used in contact with each other, one with lower ionization potential is called the donor-type organic compound. Therefore, any organic compound may be used as the donor-type organic compound as long as the organic compound having characteristic to donate electrons. Examples of the donor-type organic compound that can be used include a triarylamine compound, a benzidine compound, a pyrazoline compound, a styrylamine compound, a hydrazone compound, a triphenylmethane compound, a carbazole compound, a polysilane compound, a thiophene compound, a phthalocyanine compound, a cyanine compound, a merocyanine compound, an oxonol compound, a polyamine compound, an indole compound, a pyrrole compound, a pyrazole compound, a polyarylene compound, a fused aromatic carbocyclic compound (naphthalene derivative, anthracene derivative, phenanthrene derivative, tetracene derivative, pyrene derivative, perylene derivative, fluoranthene derivative), a metal complex having a nitrogen-containing heterocyclic compound as a ligand, etc. The donor-type organic semiconductor is not limited thereto but any organic compound having lower ionization potential than the organic compound used as an n-type (acceptor-type) compound may be used as the donor-type organic semiconductor.

The n-type organic semiconductor (compound) is an acceptor-type organic semiconductor (compound) as chiefly represented by an electron transport organic compound, meaning an organic compound having characteristic to easily accept electrons. More specifically, when two organic compounds are used in contact with each other, one of the two organic compounds with higher electron affinity is the acceptor-type organic compound. Therefore, any organic compound may be used as the acceptor-type organic compound as long as the organic compound having characteristic to accept electrons. Examples thereof include a fused aromatic carbocyclic compound (naphthalene derivative, anthracene derivative, phenanthrene derivative, tetracene derivative, pyrene derivative, perylene derivative, fluoranthene derivative), a 5- to 7-membered heterocyclic compound containing a nitrogen atom, an oxygen atom or a sulfur atom (e.g. pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine, tribenzazepine etc.), a polyarylene compound, a fluorene compound, a cyclopentadiene compound, a silyl compound, and a metal complex having a nitrogen-containing heterocyclic compound as a ligand. The acceptor-type organic semiconductor is not limited thereto. Any organic compound may be used as the acceptor-type organic semiconductor as long as the organic compound has higher electron affinity than the organic compound used as the donor-type organic compound.

As for p-type organic dye or n-type organic dye, any known dye may be used. Preferred examples thereof include cyanine dyes, styryl dyes, hemicyanine dyes, merocyanine dyes (including zero-methine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, and fused aromatic carbocyclic dyes (naphthalene derivative, anthracene derivative, phenanthrene derivative, tetracene derivative, pyrene derivative, perylene derivative, fluoranthene derivative).

A photoelectric conversion film (photosensitive layer) which has a layer of a p-type semiconductor and a layer of an n-type semiconductor between a pair of electrodes and at least one of the p-type semiconductor and the n-type semiconductor is an organic semiconductor and in which a bulk heterojunction structure layer including the p-type semiconductor and the n-type semiconductor is provided as an intermediate layer between those semiconductor layers may be used preferably. The bulk heterojunction structure layer included in the photoelectric conversion film can cover the defect that the carrier diffusion length of the organic layer is short. Thus, the photoelectric conversion efficiency can be improved. The bulk heterojunction structure has been described in detail in JP-A-2005-303266.

It is preferable that the photoelectric conversion film is thicker in view of absorption of light from the phosphor layer. The photoelectric conversion film is preferably not thinner than 30 nm and not thicker than 300 nm, more preferably not thinner than 50 nm and not thicker than 250 nm, particularly more preferably not thinner than 80 nm and not thicker than 200 nm in consideration of the ratio which does make any contribution to separation of electric charges.

As for any other configuration about the aforementioned OPC film, for example, refer to description in JP-A-2009-32854.

[6-2. Organic Thin Film Transistor (TFT)]

Although inorganic materials are often used for the aforementioned TFT switching elements 42, organic materials may be used, for example, as disclosed in JP-A-2009-212389. Organic TFT may have any type of structure but a field effect transistor (FET) structure is the most preferable. In the FET structure, a substrate is disposed in the bottom layer, and a gate electrode is provided partially an upper surface of the substrate. An insulator layer is provided to cover the electrode and touch the substrate in the other portion than the electrode. Further, a semiconductor active layer is provided on an upper surface of the insulator layer, and a source electrode and a drain electrode are disposed partially on the upper surface of the semiconductor active layer and at a distance from each other. This configuration is called a top contact type device. A bottom contact type device in which a source electrode and a drain electrode are disposed under a semiconductor active layer may be also used preferably. In addition, a vertical transistor structure in which a carrier flows in the thickness direction of an organic semiconductor film may be used.

(Semiconductor Active Layer)

A p-type organic semiconductor material is used as the material of the semiconductor active layer. The p-type organic semiconductor material is substantially colorless and transparent. For example, the thickness of the organic semiconductor thin film may be measured by a stylus thickness meter. A plurality of thin films with different thicknesses may be manufactured and their absorption spectra may be measured so that the maximum absorbance per film thickness of 30 nm can be obtained by conversion based on a calibration curve.

Organic semiconductor materials mentioned herein are organic materials showing properties as semiconductors. Examples of the organic semiconductor materials include p-type organic semiconductor materials (or referred to as p-type materials simply or as electron hole transport materials) which conduct electron holes (holes) as carriers, and n-type organic semiconductor materials (or referred to as n-type materials simply or as electrode transport materials) which conduct electrons as carriers, similarly to a semiconductor formed out of an inorganic material. Of the organic semiconductor materials, lots of p-type materials generally show good properties. In addition, p-type transistors are generally excellent in operating stability as transistors under the atmosphere. Here, description here will be made on a p-type organic semiconductor material.

One of properties of organic thin film transistors is a carrier mobility (also referred to as mobility simply) μ which indicates the mobility of a carrier in an organic semiconductor layer. Although preferred mobility varies in accordance with applications, higher mobility is generally preferred. The mobility is preferably not lower than $1.0 \times 10^{-7}$ cm$^2$/Vs, more preferably not lower than $1.0 \times 10^{-6}$ cm$^2$/Vs, further preferably not lower than $1.0 \times 10^{-5}$ cm$^2$/Vs. The mobility can be obtained by properties or TOF (Time Of Flight) measurement when the field effect transistor (FET) device is manufactured.

The p-type organic semiconductor material may be either a low molecular weight material or a high molecular weight material, but preferably a low molecular weight material. Lots of low molecular weight materials typically show excellent properties due to easiness in high purification because various refining processes such as sublimation refining, recrystallization, column chromatography, etc. can be applied thereto, or due to easiness in formation of a highly ordered crystal structure because the low molecular weight materials have a fixed molecular structure. The molecular weight of the low molecular weight material is preferably not lower than 100 and not higher than 5,000, more preferably not lower than 150 and not higher than 3,000, further more preferably not lower than 200 and not higher than 2,000.

Preferred specific examples of such a p-type organic semiconductor material will be shown. Bu represents a butyl group, Pr represents a propyl group, Et represents an ethyl group, and Ph represents a phenyl group.

[Chem. 1]
Compound 1 to 15

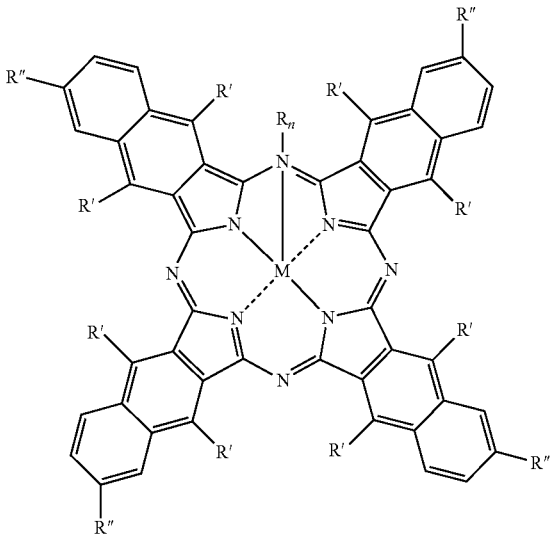

Compound 16 to 20

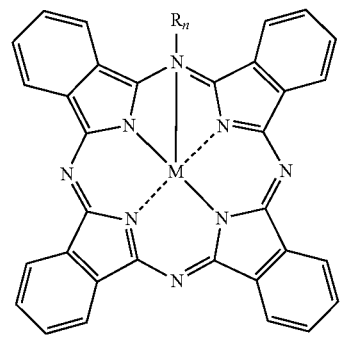

| Compound | M | R | n | R' | R'' |
|---|---|---|---|---|---|
| 1 | Si | OSi(n-Bu)$_3$ | 2 | H | H |
| 2 | Si | OSi(i-Pr)$_3$ | 2 | H | H |
| 3 | Si | OSi(OEt)$_3$ | 2 | H | H |
| 4 | Si | OSiPh$_3$ | 2 | H | H |
| 5 | Si | O(n-C$_8$H$_{17}$) | 2 | H | H |
| 7 | Ge | OSi(n-Bu)$_3$ | 2 | H | H |
| 8 | Sn | OSi(n-Bu)$_3$ | 2 | H | H |
| 9 | Al | OSi(n-C$_6$H$_{13}$)$_3$ | 1 | H | H |
| 10 | Ga | OSi(n-C$_6$H$_{13}$)$_3$ | 1 | H | H |
| 11 | Cu | — | — | O(n-Bu) | H |
| 12 | Ni | — | — | O(n-Bu) | H |
| 13 | Zn | — | — | H | t-Bu |
| 14 | V=O | — | — | H | t-Bu |
| 15 | H$_2$ | — | — | H | t-Bu |
| 16 | Si | OSiEt$_3$ | 2 | — | — |
| 17 | Ge | OSiEt$_3$ | 2 | — | — |
| 18 | Sn | OSiEt$_3$ | 2 | — | — |
| 19 | Al | OSiEt$_3$ | 1 | — | — |
| 20 | Ga | OSiEt$_3$ | 1 | — | — |

(Device Constituent Materials Other than Semiconductor Active Layer)

Description will be made below on device constituent materials other than the semiconductor active layer in the organic thin film transistor. The visible-light or infrared-light transmittance of each of those materials is preferably not lower than 60%, more preferably not lower than 70%, further more preferably not lower than 80%.

The substrate is not limited particularly as long as it has required smoothness. Examples of the substrate include glass, quartz, light transmissive plastic film, etc. Examples of the light transmissive plastic film include films or the like, made from polyethylene terephthalate (PET), polyethylene naphthalate (PEN), polyether sulfone (PES), polyether imide, polyetheretherketone, polyphenylene sulfide, polyalylate, polyimide, polycarbonate (PC), cellulose triacetate (TAC), cellulose acetate propionate (CAP), etc. In addition, any organic or inorganic filler may be contained in these plastic films. A flexible substrate formed out of aramid, bionanofiber, or the like may be used preferably as the substrate.

The material forming the gate electrode, the source electrode or the drain electrode is not limited especially if it has required electric conductivity. Examples thereof include electrically conductive oxides such as ITO (indium-doped tin oxide), IZO (indium-doped zinc oxide), $SnO_2$, ATO (antimony-doped tin oxide), ZnO, AZO (aluminum-doped zinc oxide), GZO (gallium-doped zinc oxide), $TiO_2$, FTO (fluorine-doped tin oxide), etc., electrically conductive polymers such as PEDOT/PSS (poly(3,4-ethylenedioxythiophene)/polystyrenesulfonate), carbon materials such as carbon nanotube, etc. These electrode materials may be formed into films, for example, by a method such as a vacuum deposition method, sputtering, a solution application method, etc.

The material used for the insulating layer is not limited particularly as long as it has required insulating effect. Examples thereof include inorganic materials such as silicon dioxide, silicon nitride, alumina, etc., and organic materials such as polyester, (PEN (polyethylene naphthalate), PET (polyethylene terephthalate) etc.), polycarbonate, polyimide, polyamide, polyacrylate, epoxy resin, polyparaxylylene resin, novolak resin, PVA (polyvinyl alcohol), PS (polystyrene), etc. These insulating film materials may be formed into films, for example, by a method such as a vacuum deposition method, sputtering, a solution application method, etc.

As for any other configuration about the aforementioned organic TFT, for example, refer to description in JP-A-2009-212389.

[6-3. Amorphous Oxide Semiconductor]

For example, amorphous oxide disclosed in JP-A-2010-186860 may be used for the aforementioned TFT switching elements 42. Here, description will be made on an amorphous oxide containing active layer of a FET transistor disclosed in JP-A-2010-186860. The active layer serves as a channel layer of the FET transistor where electrons or holes move.

The active layer has a configuration containing an amorphous oxide semiconductor. The amorphous oxide semiconductor can be formed into a film at a low temperature. Thus, the amorphous oxide semiconductor is formed preferably on a flexible substrate. The amorphous oxide semiconductor used for the active layer is preferably amorphous oxide containing at least one kind of element selected from a group consisting of In, Sn, Zn and Cd, more preferably amorphous oxide containing at least one kind of element selected from a group consisting of In, Sn and Zn, further preferably amorphous oxide containing at least one kind of element selected from a group consisting of In and Zn.

Specific examples of the amorphous oxide used for the active layer include $In_2O_3$, ZnO, $SnO_2$, CdO, Indium-Zinc-Oxide (IZO), Indium-Tin-Oxide (ITO), Gallium-Zinc-Oxide (GZO), Indium-Gallium-Oxide (IGO), and Indium-Gallium-Zinc-Oxide (IGZO).

It is preferable that a vapor phase film formation method targeting at a polycrystal sinter of the oxide semiconductor is used as a method for forming the active layer. Of vapor phase film formation methods, a sputtering method or a pulse laser deposition (PLD) method is preferred. Further, the sputtering method is preferred in view from mass productivity. For example, the active layer is formed by an RF magnetron sputtering deposition method with a controlled degree of vacuum and a controlled flow rate of oxygen.

The thus formed active layer is confirmed to be an amorphous film by a well-known X-ray diffraction method. The composition ratio of the active layer is obtained by an RBS (Rutherford Backscattering Spectrometry) method.

In addition, the electric conductivity of the active layer is preferably lower than $10^2$ $Scm^{-1}$ and not lower than $10^{-4}$ $Scm^{-1}$, more preferably lower than $10^2$ $Scm^{-1}$ and not lower than $10^{-1}$ $Scm^{-1}$. Examples of the method for adjusting the electric conductivity of the active layer include a known adjusting method using oxygen defect, an adjusting method using a composition ratio, an adjusting method using impurities, and an adjusting method using an oxide semiconductor material.

As for any other configuration about the aforementioned amorphous oxide, for example, refer to description in JP-A-2010-186860.

[6-4. Flexible Material]

It may be considered that aramid, bionanofiber, etc. having properties such as flexibility, low thermal expansion and high strength, which cannot be obtained in existing glass or plastic, are used in a radiological image detection apparatus.

(1) Aramid

A film (or a sheet or a substrate) formed out of aramid which is a flexible material may be used as the insulating substrate 401 of the aforementioned sensor board, the support 101, the circuit board of the control module, or the like. An aramid material has high heat resistance showing a glass transition temperature of 315° C., high rigidity showing a Young's modulus of 10 GPa, and high dimensional stability showing a thermal expansion coefficient of −3 to 5 ppm/° C. Therefore, when a film made from aramid is used, it is possible to easily form a high-quality film for a semiconductor layer or a phosphor layer, as compared with the case where a general resin film is used. In addition, due to the high heat resistance of the aramid material, a transparent electrode material can be cured at a high temperature to have low resistance. Further, it is also possible to deal with automatic mounting with ICs, including a solder reflow step. Furthermore, since the aramid material has a thermal expansion coefficient close to that of ITO (indium tin oxide), a gas barrier film or a glass substrate, warp after manufacturing is small. In addition, cracking hardly occurs. Here, it is preferable to use a halogen-free (in conformity with the requirements of JPCA-ES01-2003) aramid material containing no halogens, in view of reduction of environmental load.

The aramid film may be laminated with a glass substrate or a PET substrate, or may be pasted onto a housing of a device.

High intermolecular cohesion (hydrogen bonding force) of aramid leads to low solubility to a solvent. When the problem of the low solubility is solved by molecular design, an aramid material easily formed into a colorless and transparent thin film can be used preferably. Due to molecular design for controlling the order of monomer units and the substituent species and position on an aromatic ring, easy formation with good solubility can be obtained with the molecular structure kept in a bar-like shape with high linearity leading to high rigidity or dimensional stability of the aramid material. Due to the molecular design, halogen-free can be also achieved.

In addition, an aramid material having an optimized characteristic in an in-plane direction of a film can be used preferably. Tensional conditions are controlled in each step of solution casting, vertical drawing and horizontal drawing in accordance with the strength of the aramid film which varies constantly during casting. Due to the control of the tensional conditions, the in-plane characteristic of the aramid film which has a bar-like molecular structure with high linearity leading to easy occurrence of anisotropic physicality can be balanced.

Specifically, in the solution casting step, the drying rate of the solvent is controlled to make the in-plane thickness-direction physicality isotropic and optimize the strength of the film including the solvent and the peel strength from a casting drum. In the vertical drawing step, the drawing conditions are controlled precisely in accordance with the film strength varying constantly during drawing and the residual amount of the solvent. In the horizontal drawing, the horizontal drawing conditions are controlled in accordance with a change in film strength varying due to heating and controlled to relax the residual stress of the film. By use of such an aramid material, the problem that the aramid film after casting may be curled.

In each of the contrivance for the easiness of casting and the contrivance for the balance of the film in-plane characteristic, the bar-like molecular structure with high linearity peculiar to aramid can be kept to keep the thermal expansion coefficient low. When the drawing conditions during film formation are changed, the thermal expansion coefficient can be reduced further.

(2) Bio-Nanofiber

Components sufficiently small relative to the wavelength of light produce no scattering of the light. Accordingly, a flexible plastic material, or the like, reinforced by nanofibers may be used preferably in the insulating substrate 401 of the aforementioned sensor board, the support 101, the circuit board of the control module, or the like. Of the nanofibers, a composite material (occasionally referred to as bionanofiber) of bacterial cellulose and transparent resin can be used preferably. The bacterial cellulose is produced by bacteria (Acetobacter Xylinum). The bacterial cellulose has a cellulose microfibril bundle width of 50 nm, which is about 1/10 as large as the wavelength of visible light. In addition, the bacterial cellulose is characterized by high strength, high elasticity and low thermal expansion.

When a bacterial cellulose sheet is impregnated with transparent resin such as acrylic resin or epoxy resin and hardened, transparent bionanofiber showing a light transmittance of about 90% in a wavelength of 500 nm while having a high fiber ratio of about 60 to 70% can be obtained. By the bionanofiber, a thermal expansion coefficient (about 3 to 7 ppm) as low as that of silicon crystal, strength (about 460 MPa) as high as that of steel, and high elasticity (about 30 GPa) can be obtained.

As for the configuration about the aforementioned bionanofiber, for example, refer to description in JP-A-2008-34556.

7. MANUFACTURING METHOD OF X-RAY IMAGE DETECTION APPARATUS

Hereinafter, a manufacturing method of a radiological image detection apparatus capable of efficiently manufacturing an X-ray image detection apparatus 1 will be described. Also, hereinafter, a method of manufacturing the X-ray image detection apparatus 1 configured such that the scintillator panel 10 is provided with the support 101 and the scintillator panel 10 and the sensor board 400 are bonded to each other as illustrated in FIGS. 1 to 6 will be described.

The above described scintillator 200 is preferably directly formed on the surface of the support 101 by a vapor deposition method. By the vapor deposition method, the second non-columnar section 25, the columnar section 20, and the first non-columnar section 23 may be sequentially and successively formed. Here, an exemplary embodiment using CsI:Tl will be described.

The summary of the vapor deposition method is as follows. Under the environment of degree of vacuum 0.01 Pa to 10 Pa, CsI:Tl is heated and vaporized, for example, by means of applying electric current to a resistance heating type crucible, then the temperature of the support 101 is set to room temperature (20° C.) to 300° C., and then CsI:Tl is deposited on the support.

When the crystalline phase of CsI:Tl is formed on the support 101 by the vapor deposition method, an aggregation of relatively small crystals with an indeterminate or substantially spherical diameter is initially formed. In the performance of the vapor deposition method, by varying at least one condition of the degree of vacuum, the support temperature, and the evaporation rate (evaporation cell temperature), it is possible to grow the columnar crystals 20A in succession to the formation of the second non-columnar section 25 (a scintillator forming step).

That is, after the second non-columnar section 25 is formed to a predetermined thickness t2, the columnar crystals 20A may be efficiently and uniformly grown by performing at least one of the means of increasing the degree of vacuum, increasing of the support temperature, and decreasing of the evaporation rate. Then, by performing at least one of a decrease of the degree of vacuum, a decrease of the support temperature, and an increase of the evaporation rate, the first non-columnar section 23 is grown. Also, the activation amount of Tl may be varied according to each of the first non-columnar section 23, the second non-columnar section 25, and the columnar section 20.

Although in the example as described above, CsI:Tl is used as a material for any one of the first non-columnar section 23, the second non-columnar section 25 and the columnar section 20, it may be considered to use CsI:Tl in the formation of only the columnar section 20 that highly contributes to the luminous efficiency of the entire scintillator 200 due to its high luminous efficiency and light guide function. In this case, the above described advantages of the use of CsI:Tl in terms of the emission spectrum and the deterioration with elapse of time due to humidity may be also sufficiently achieved.

After the scintillator 200 is formed on the support 101 in the scintillator forming step as described above, the scintillator 200 is sealed on the support 101 through evaporative formation of the protective film 30 using parylene or the like by the same vapor deposition method so as to provide the scintillator panel 10. Also, the protective film 30 may not be formed in a case where moisture-proof of the scintillator 200 is secured by any other means such as airtight wrapping-up of the scintillator panel 10 by a moisture-proof film.

By bonding the scintillator panel 10 to the photodetector 40, the X-ray image detection apparatus 1 may be obtained. By the above described improvement of the adhesion with the sensor board 400, the bonding may readily be performed. The method of bonding the scintillator panel 10 to the photodetector 40 is not particularly limited, and these two elements may be preferably optically coupled to each other. As for the bonding method of the two elements, any one of a method of directly facing the two elements and then bringing the two elements to be in close contact with each other, and a method of bringing the two elements to be in close contact with each other via any adhesive layer or a flattening layer may be selected.

As for the method of directly bringing the two elements in close contact with each other, there is a method where the scintillator 200 is formed on the support 101, and then the front end side portion in the growth direction of the columnar section 20 of the formed scintillator 200 faces and comes in close contact with the sensor board 400 as a photodetector. In this manner, the two elements are bonded to each other so as to provide the X-ray image detection apparatus 1.

Also, the front end side portion in the growth direction of the columnar crystals 20A of the formed scintillator 200 may be optically coupled to the photodetector 40 while the two elements face each other via a resin layer. As for the resin layer, an adhesive layer that brings the scintillator 200 in close contact with the photodetector 40 and fixes the two elements to each other, or a matching oil layer made of transparent liquid or gel may be used. There is no particular limitation in the resin that constitutes the resin layer, as long as it may allow the scintillation light emitted from the scintillator 200 to reach the photodetector 40 with little attenuation.

As for the resin that constitutes the flattening layer, polyimide, parylene or the like may be used, and polyimide with a good film-forming property is preferred.

As for the adhesive that constitutes the adhesive layer, an adhesive that is optically transparent to the scintillation light emitted from the scintillator 200 is preferred, For example, a thermoplastic resin, a UV-curable adhesive, a heat curing adhesive, a room temperature setting adhesive, a double-sided adhesive sheet may be used. However, from the viewpoint of not degrading the sharpness of an image, it is preferable to use an adhesive made of a low viscosity epoxy resin since it may form a sufficiently thin adhesive layer with respect to a pixel size of the photodetector 40.

Also, from the viewpoint of sensitivity, and an image, the thickness of the resin layer is preferably 50 μm or less, and more preferably ranges from 5 μm to 30 μm.

By the manufacturing method as described above, the X-ray image detection apparatus 1 may be efficiently and easily manufactured. Also, according to this manufacturing method, there is an advantage in that by controlling the degree of vacuum or the support temperature, the scintillator 200 with various specifications may be simply manufactured in accordance with designs.

Also, the method of manufacturing the type of X-ray image detection apparatus 2 where the scintillator 220 is directly vapor-deposited on the sensor board 400 as illustrated in FIGS. 8 and 9, is almost the same as the above described manufacturing method. After CsI:Tl is deposited on the sensor board 400 instead of the support 101 under a predetermined condition, the protective film 31 may be vapor-deposited. The bonding step of the sensor board 400 to the scintillator panel 10 as performed in the configuration in FIGS. 1 to 6 is not necessary.

8. MANUFACTURING EXAMPLES

Although the present invention is described in more detail below, the present invention but is not limited to specific examples.

Manufacturing Example 1

1. Film-Forming of Scintillator

An alkali-free glass substrate (0.7 mm) for liquid crystals was prepared as the support.

First, surface treatment was performed to the support for the purpose of improving the adhesion with the CsI crystal layer. Then, the surface treated support was set in a vacuum chamber for scintillator film-forming. The vacuum chamber was provided with a plurality of crucibles for independently heating each of the CsI and Tl which are the raw materials of the vacuum chamber. After evacuating the chamber, a predetermined amount of Ar was introduced, thereby setting the degree of vacuum of the device to 0.75 Pa. At the time when the molten state of the raw materials was stabilized by heating the raw material crucibles, the support was concentrically rotated by a device instrument of a vacuum device and a shutter was opened, thereby starting the deposition of the second non-columnar section.

Film fabrication was performed at these conditions. When the film thickness of the second non-columnar section t2 reached 5 μm, the degree of vacuum was increased to 1 Pa and the vapor deposition of columnar crystals was started. Since the molten state of the raw materials is changed when the degree of vacuum is changed. Thus, the shutter was closed once and it was confirmed that the molten state was stabilized. Then, the shutter was opened again and then vapor deposition was restarted. When the film thickness of the columnar crystals t1 reached 500 μm, the heating of the crucibles was stopped, air intake was made by the vacuum device, and a scintillator including a second non-columnar section and a columnar section was formed on the support.

2. Test of Physical Property in Scintillator Layer 2-1. Measurement of Thickness of Second Non-Columnar Section t2 and Thickness of Columnar Section t2

The film thicknesses were measured by cutting arbitrary portions of the scintillator and observing the side surfaces of the columnar crystals using an SEM (scanning electron micrograph). Among the sampled portions, ten (10) portions were randomly selected and the mean value of measured values was used as the value of the film thickness. The SEM observation of CsI was conducted after sputtering Au about 200 Å due to the non-conductivity.

2-2. Measurement of Crystal Diameters of Second Non-Columnar Section and Columnar Section The columnar diameters (cross-sectional diameters of columnar crystals) were measured by peeling a part of scintillator off from a support or a light detection substrate in Manufacturing Example 13 to be described below and observing a surface perpendicular to the film thickness direction of the columnar crystals using the SEM (scanning electron micrograph). The observation was performed with a magnification (about 2,000×) that allows 100 to 200 columnar crystals 20A to be observed when the scintillator is viewed from the surface at one shot, and the maximum values of the columnar diameters were measured and an average was taken thereon for all the crystals included at the one shot is employed.

In addition, when crystals are coalescent to each other as in the second non-columnar section, the measurement of crystal diameter was performed as follows. A line interconnecting adjacent concave portions (recesses) formed between adjacent non-columnar crystals 25A was considered as a grain boundary between the crystals, the coalescent crystals were separated to be the smallest polygons, and the crystal diameters were measured. Then, columnar diameter (μm) was determined by reading out the measured values to two decimal places and rounding off to one decimal place in accordance with JISZ8401.

When it was difficult to peel off the scintillator from the support, the scintillator was sliced perpendicularly to the crystal growth direction at a position of about 10 μm from the support, an etching was performed using Ar ions to a distance where the shapes in the vicinity of interfaces of CsI crystals adhered to the support may be observed, and then observation was performed on the etched surface. The SEM observation of CsI was conducted after sputtering Au about 200 Å due to the non-conductivity.

2-3. Measurement of Porosity of Non-Columnar Section

For Manufacturing Examples 1 to 11, the porosities of second non-columnar sections at the position corresponding to the B-B cross-section of FIG. 4 were measured and indicated in Table 1. The porosities of the second non-columnar sections were calculated based on the deposited areas of the second non-columnar sections to the supports, the thicknesses of the second non-columnar sections, the CsI densities, and the practically measured weights of the scintillators.

3. Fabrication of Radiological Image Detection Apparatus

After preparing a photodetector, a low viscosity epoxy resin adhesive (Araldite 2020 manufactured by Huntsman Corporation) diluted by a solvent was coated on the surface of the photodetector by a spin coating to such an extent that the thickness of the epoxy resin adhesive becomes to 15 μm after the solvent volatilizes. The columnar section side of the obtained scintillator is placed to be opposed to the adhesive layer formed on the photodetector, and then the photodetector and the scintillator were heated to be bonded to each other through the adhesive layer.

Thereafter, an X-ray image detection apparatus of Manufacturing Example 1 was manufactured by bonding a circuit board for driving TFTs and an integrated circuit (IC) for reading out electric charges were adhered to the terminal unit of the photodetector by an anisotropic conductive film, and connecting them to a circuit board for driving control and AD conversion.

Arrangement was made such that radiation is incident from the photodetector side, and the read-out of a radiological image was conducted by controlling a scanning PC connected with the X-ray image detection apparatus through a cable.

4. Test on Radiological Image Detection Apparatus 4-1. Sensitivity

X-rays were used as the radiation. When irradiating X-rays, the photodetector was driven by an electric circuit, the electric charges by photoelectric conversion produced by the scintillator light in a photodiode were read out, the electric charges were amplified by a charge amplifier, and then AD-converted. As such, the quantity of generated electric charges was calculated.

The quantity of read-out charge (noise of a detection system) at the time on non-irradiating X-rays was measured in advance, and a value obtained by subtracting it from the quantity of generated electric charges was determined as the sensitivity. Also, the result is expressed as a relative value when the sensitivity in Manufacturing Example 12 to be described below is 100. The sensitivity of Manufacturing Example 1 was 120.

4-2. MTF (Modulation Transfer Function)

In accordance with IEC Standards, edge images obtained by photographing MTF edges made of W (tungsten) were calculated to obtain an MTF curve. The result was compared to a value of 2 cycle/mm, and is expressed as a relative value when the value of Manufacturing Example 12 is 100.

4-3. Overall Determination

The performance of the radiological image detection apparatus was determined based on the multiplication of the sensitivities and the MTF evaluation results. It is desirable if the multiplication of a sensitivity and an MTF is 120 or more since the difference in performance may be clearly recognized when an image is subject to an sensory evaluation. The overall determination of Manufacturing Example 1 was 120, and for Manufacturing Example 12, it will be appreciated that the sensitivity and the sharpness of an image are excellent.

Manufacturing Example 12

The substrate was changed to the glass substrate used in manufacturing example 1 as the support. The glass substrate was formed with unevenness through wet etching with an about 5 μm pitch and an about 5 μm height on the surface of the glass substrate and used.

In forming the scintillator, the radiological image detection apparatus of Manufacturing Example 12 was manufactured as in Manufacturing Example 1 except that the columnar crystal layer was directly vapor-deposited on the support without performing the vapor deposition of the non-columnar crystal section. Evaluation was made in the same manner with that of Manufacturing Example 1, and relative evaluation was made assuming the result of Manufacturing Example 12 is 100.

Manufacturing Examples 2 to 6

Radiological image detection apparatuses of Fabrication Examples 2 to 6 were manufactured as in Manufacturing Example 1 except that the film thicknesses of the non-columnar crystal sections were adjusted as represented in Table 1 by changing the deposition time when the degree of vacuum was 0.75 Pa, and evaluated in the same manner. The results are represented in Table 1 below.

Manufacturing Examples 7 to 11

Radiological image detection apparatuses of Manufacturing Examples 7 to 11 were manufactured as in Manufacturing Example 1 except that in Manufacturing Example 1, the degree of vacuum was changed to those represented in Table 1, and the crystal diameters at the non-columnar section 25 were prepared as indicated in Table 1, and evaluated in the same manner. The results are represented in Table 1 below.

Manufacturing Example 13

The support was changed to the glass substrate used in Manufacturing Example 3 and scintillator was directly formed by fabricating a film under the same conditions with those in Manufacturing Example 3. In the present aspect, the second non-columnar section in the vicinity of the photodetector was formed first and then the columnar section was formed. The bonding by a thermosetting adhesive is not performed. The processings except this were performed as in Manufacturing Example 3.

TABLE 1

| | | Phosphor Film Forming Method | | Phosphor Shape | | | | | | Evaluation result | | |
|---|---|---|---|---|---|---|---|---|---|---|---|---|
| | | Degree of vacuum | | Non-columnar diameter | | | Columnar diameter | | Film | | | |
| | Support | Non-columnar section | Columnar section | Film thickness t2 | Mean crystal diameter | Porosity (%) | Film thickness t1 | Mean columnar diameter | thickness ratio t2/t1 | Sensitivity | MTF | Overall Determination |
| Manufacturing Example 1 | Alkali-free glass | 0.75 Pa | 1 Pa | 5 | 3.3 | 9.0 | 500 | 7.6 | 0.01 | 120 | 100 | 120 |
| Manufacturing Example 2 | Alkali-free glass | 0.75 Pa | 1 Pa | 10 | 3.0 | 9.2 | 500 | 7.2 | 0.02 | 121 | 100 | 121 |
| Manufacturing Example 3 | Alkali-free glass | 0.75 Pa | 1 Pa | 25 | 3.0 | 9.0 | 500 | 6.8 | 0.05 | 123 | 101 | 124 |
| Manufacturing Example 4 | Alkali-free glass | 0.75 Pa | 1 Pa | 50 | 3.1 | 9.1 | 500 | 7.2 | 0.10 | 122 | 100 | 122 |
| Manufacturing Example 5 | Alkali-free glass | 0.75 Pa | 1 Pa | 125 | 3.4 | 9.3 | 500 | 7.1 | 0.25 | 120 | 100 | 120 |
| Manufacturing Example 6 | Alkali-free glass | 0.75 Pa | 1 Pa | 170 | 3.2 | 9.3 | 500 | 7.0 | 0.34 | 121 | 94 | 114 |
| Manufacturing Example 7 | Alkali-free glass | 0.1 Pa | 1 Pa | 25 | 11.2 | 4.0 | 500 | 6.8 | 0.05 | 111 | 91 | 101 |
| Manufacturing Example 8 | Alkali-free glass | 0.3 Pa | 1 Pa | 25 | 8.0 | 7.0 | 500 | 7.0 | 0.05 | 117 | 99 | 116 |
| Manufacturing Example 9 | Alkali-free glass | 0.5 Pa | 1 Pa | 25 | 6.2 | 8.8 | 500 | 7.0 | 0.05 | 123 | 100 | 123 |
| Manufacturing Example 10 | Alkali-free glass | 1.5 Pa | 1 Pa | 25 | 1.5 | 9.4 | 500 | 7.2 | 0.05 | 122 | 100 | 122 |
| Manufacturing Example 11 | Alkali-free glass | 3 Pa | 1 Pa | 25 | 0.5 | 9.3 | 500 | 7.0 | 0.05 | 122 | 100 | 122 |
| Manufacturing Example 12 | Patterning substrate | — | 1 Pa | — | — | — | 500 | 6.8 | — | 100 | 100 | 100 |
| Manufacturing Example 13 | Photodetector (TFT) substrate | 0.75 Pa | 1 Pa | 25 | 3.1 | 9.0 | 500 | 6.9 | 0.05 | 98 | 96 | 94 |

In addition, the unit of each of film thickness, mean crystal diameter and mean columnar diameter represented in Table 1 is μm.

As clear from Table 1, it will be appreciated that the radiological image detection apparatuses of Manufacturing Examples 1 to 11 of the present invention are highly sensitive and the deterioration of an image such as image burr is suppressed so that the sharpness of an obtained image is high, as compared to Manufacturing Example 12 in which the scintillator is entirely formed by columnar crystals.

Meanwhile, in Manufacturing Example 13 that includes the second non-columnar section in the vicinity of the photodetector side, it will be appreciated that it is impossible to obtain a sufficient sensitivity due to the degradation of scattering and luminescence efficiencies in the second non-columnar section.

9. DISCLOSURE OF PRESENT DESCRIPTION

As described above, the present description discloses a radiological image detection apparatus comprising: a scintillator configured to emit fluorescence by irradiation of radiation, and a photodetector configured to detect the fluorescence emitted from the scintillator as an electrical signal, in which the scintillator comprises a columnar section which is disposed at a rear side of the photodetector in a travel direction of the radiation and is formed by a group of columnar crystals obtained through columnar growth of crystals of a fluorescent material, and a first non-columnar section which is provided at the photodetector side of the columnar section.

And, in the radiological image detection apparatus disclosed in the present description, the first non-columnar section has a porosity of 10% or less.

And, in the radiological image detection apparatus disclosed in the present description, the first non-columnar section has a thickness of 3 μm or more and 50 μm or less.

And, in the radiological image detection apparatus disclosed in the present description, the first non-columnar section comprises a group of non-columnar crystals of the fluorescent material in substantially spherical or indeterminate shapes, and at least a part of the non-columnar crystals included in the first non-columnar section are fused in an in-plane direction perpendicular to a thickness direction of the first non-columnar section.

And, in the radiological image detection apparatus disclosed in the present description, the scintillator comprises a second non-columnar section provided at an opposite side to the first non-columnar section side of the columnar section.

And, in the radiological image detection apparatus disclosed in the present description, the second non-columnar section comprises a group of non-columnar crystals of the fluorescent material in substantially spherical or indeterminate shapes, and at least a part of the non-columnar crystals included in the second non-columnar section are fused in an in-plane direction perpendicular to a thickness direction of the second non-columnar section.

And, in the radiological image detection apparatus disclosed in the present description, a porosity of the first non-columnar section is lower than a porosity of the second non-columnar section.

And, in the radiological image detection apparatus disclosed in the present description, a thickness of the first non-columnar section is smaller than a thickness of the second non-columnar section.

And, in the radiological image detection apparatus disclosed in the present description, the photodetector comprises a sensor board that comprises a photoelectric conversion element, and the sensor board is bonded to a portion of the scintillator at the first non-columnar section side.

And, in the radiological image detection apparatus disclosed in the present description, the first non-columnar section is provided at least between the columnar crystals of a front end portion of a crystal growth direction of the columnar section to flatten the scintillator.

And, in the radiological image detection apparatus disclosed in the present description, the photodetector comprises a sensor board formed with a photoelectric conversion element, and the scintillator is vapor-deposited on the sensor board by a vapor deposition method.

And, in the radiological image detection apparatus disclosed in the present description, the first non-columnar section and the columnar section of the scintillator are formed in this order on the sensor board, and a portion of the first non-columnar section in contact with an outermost layer of the sensor board has a porosity of 0 or substantially 0.

And, in the radiological image detection apparatus disclosed in the present description, the scintillator is covered with a protective film.

And, in the radiological image detection apparatus disclosed in the present description, the protective film is parylene.

And, in the radiological image detection apparatus disclosed in the present description, the protective film is vapor-deposited by a vapor deposition method.

And, in the radiological image detection apparatus disclosed in the present description, in the scintillator, at least the columnar section is formed to comprise CsI and Tl.

And, the radiological image detection apparatus disclosed in the present description is configured as a portable cassette.

And, the present description discloses a method of manufacturing the radiological image detection apparatus as described above, in which the columnar section and the first non-columnar section of the scintillator are formed on the support by depositing crystals of the fluorescent material on the support by a vapor deposition method, and the first non-columnar section is formed by varying at least one condition among a degree of vacuum, a support temperature, and an evaporation rate at the time of formation of the columnar section.

The present invention has been described in detail with reference to specific exemplary embodiments. However, it is apparent to those skilled in the art that various changes and modification may be made without departing from the spirit and scope of the present invention. The present application is based on Japanese Patent Application No. 2010-291387 filed 27 Dec. 2010, and the contents thereof are incorporated herein by reference.

INDUSTRIAL APPLICABILITY

The present invention may detect a radiological image with a high sensitivity and a high definition, and thus may be used while embedded within various devices requiring detection of a sharp image at a low radiation irradiation dose, including an X-ray imaging device for medical diagnosis such as mammography. For example, the device has a wide application range because it may be used as an X-ray imaging device for industrial use for a non-destructive test, or as a device for detecting corpuscular beams ($\alpha$ rays, $\beta$-rays, $\gamma$ rays) besides electromagnetic waves.

REFERENCE SIGNS LIST

1: X-ray image detection apparatus (radiological image detection apparatus)
10: scintillator panel
101: support
200: scintillator
20: columnar section
20A: columnar crystals
23: first non-columnar section
23A: non-columnar crystals
25: second non-columnar section
25A: non-columnar crystals
30: protective film
40: photodetector
400: sensor board
50: control module

The invention claimed is:

1. A radiological image detection apparatus comprising:
a scintillator configured to emit fluorescence by irradiation of radiation,
a photodetector configured to detect the fluorescence emitted from the scintillator as an electrical signal, and
a control module that drives and controls the photodetector,
wherein the photodetector, the scintillator and the control module are arranged in order from an entrance side of the radiation,
wherein the photodetector comprises a sensor board including a glass substrate and switching elements and photoelectric conversion elements formed on the glass substrate,
wherein a resin flattening layer is provided on a surface of the sensor board, the surface is opposed to the scintillator, and
wherein the scintillator comprises a columnar section which is formed by a group of columnar crystals obtained through columnar growth of crystals of a fluorescent material containing cesium iodide, and a first non-columnar section which is provided at the sensor board side of the columnar section.

2. The radiological image detection apparatus of claim 1, wherein the first non-columnar section has a porosity of 10% or less.

3. The radiological image detection apparatus of claim 1, wherein the first non-columnar section has a thickness of 3 µm or more and 50 µm or less.

4. The radiological image detection apparatus of claim 1, wherein the scintillator comprises a second non-columnar section provided at an opposite side to the first non-columnar section side of the columnar section.

5. The radiological image detection apparatus of claim 4, wherein the porosity of the first non-columnar section is smaller than the porosity of the second non-columnar section.

6. The radiological image detection apparatus of claim 4, wherein the thickness of the first non-columnar section is smaller than the thickness of the second non-columnar section.

7. The radiological image detection apparatus of claim 1, wherein the sensor board is bonded to a portion of the scintillator at the first non-columnar section side.

8. The radiological image detection apparatus of claim 7, wherein the first non-columnar section is provided at least between the columnar crystals of a front end portion of a crystal growth direction of the columnar section to flatten the scintillator.

9. The radiological image detection apparatus of claim 1, wherein the scintillator is vapor-deposited on the sensor board by a vapor deposition method.

10. The radiological image detection apparatus of claim 9, wherein the first non-columnar section is formed at an initial stage of vapor deposition on the sensor board, and the first non-columnar section has a porosity of 0.

11. The radiological image detection apparatus of claim 1, wherein the scintillator is covered with a protective film.

12. The radiological image detection apparatus of claim 11, wherein the protective film is parylene.

13. The radiological image detection apparatus of claim 11, wherein the protective film is vapor-deposited by a vapor deposition method.

14. The radiological image detection apparatus of claim 1 which is configured as a portable cassette.

* * * * *